United States Patent [19]
Asmuth et al.

[11] Patent Number: 4,611,096
[45] Date of Patent: Sep. 9, 1986

[54] TELEPHONE OFFICE SERVICE ASSIST AND HANDOFF

[75] Inventors: Richard L. Asmuth, Little Silver, N.J.; Melchior J. DiCarlo-Cottone, Wheaton, Ill.; Renato M. Ermann, Gahanna, Ohio; Mark A. Gauldin, Wheaton, Ill.; George W. Gawrys, Ocean Township, Monmouth County, N.J.; Dattatraya G. Raj-karne; Roger E. Stone, both of Naperville, Ill.; Marjorie P. Yuhas, Glen Ellyn, Ill.

[73] Assignee: AT&T Bell Laboratories, Murray Hill, N.J.

[21] Appl. No.: 557,127

[22] Filed: Dec. 1, 1983

[51] Int. Cl.[4] ............... H04M 3/42; H04M 7/06; H04Q 3/72
[52] U.S. Cl. .................... 179/18 B; 179/18 FH
[58] Field of Search ........ 179/18 B, 18 EA, 18 AD, 179/27 C, 18 ES, 18 E, 18 FH

[56] References Cited

U.S. PATENT DOCUMENTS

| | | | |
|---|---|---|---|
| 4,162,377 | 7/1979 | Mearns | 179/18 B |
| 4,191,860 | 3/1980 | Weber | 179/18 D |
| 4,229,624 | 10/1980 | Haben et al. | 179/18 E |
| 4,310,726 | 1/1982 | Asmuth | 179/18 B |
| 4,442,321 | 4/1984 | Stehman | 179/18 EB |

OTHER PUBLICATIONS

"ASSA: Tandem Exchange for Automatic Special Services", Boucharé et al., *Commutation & Transmission* (France), vol. 2, No. 2, Jul. 1980, pp. 37-56.
"GTE Private Interconnect Networks", Three Papers from NTC, New Orleans, Nov. 1981.
"The Freephone Service: A New Application for the E12 System", Carion et al., *Commutation & Transmission* (France), No. 5, Dec. 1982, pp. 63-73.

*Primary Examiner*—Thomas W. Brown
*Attorney, Agent, or Firm*—Jerry W. Herndon

[57] ABSTRACT

A method of controlling a telephone office serving a call to obtain a call processing capability not available at the office. A data base executes a customer program unique to a customer in response to each call to the customer. The customer program determines from call parameters how to process a particular call and instructs the serving office to perform specific primitive call processing capabilities to process the call. If the serving office is unable to perform a capability required to process the call in accordance with the customed program, the date base selects a second office which should be able to perform the capability. The call is routed from the first office to the second office under control of the data base and the second office performs one or more call processing capabilities under control of the data base. Call processing may be returned to the first office under control of the data base after a capability is performed at the second office. This is referred to as a service assist. On the other hand, call processing may be turned over completely to the second office, in which case it is referred to as a service handoff.

13 Claims, 75 Drawing Figures

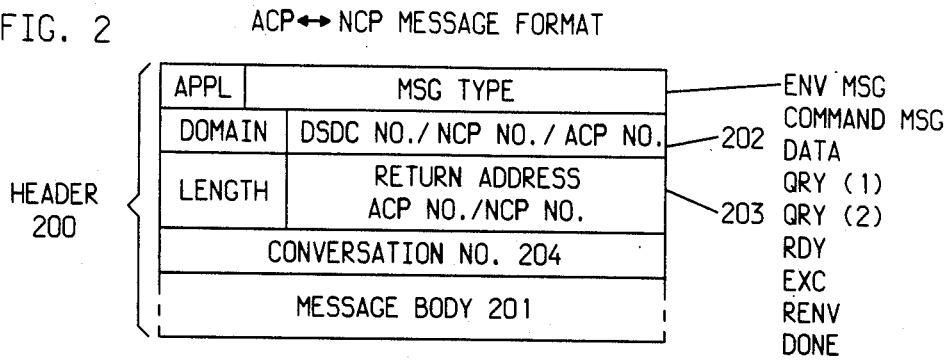

FIG. 7  DAN COMMAND

| TYPE | NO. DIGITS |
|---|---|
| DIGITS ||

FIG. 8  COL COMMAND

| TYPE | NO. DIGITS | CALLER ERROR TREATMENT | VOICE BACK |
|---|---|---|---|
| | ANNOUNCEMENT NO. | | |
| | ANNOUNCEMENT NO. | | |

FIG. 9  RTE COMMAND

| TYPE | CALL STATISTICS OPTION |
|---|---|

FIG. 10  FIN COMMAND

| TYPE | FINAL TREATMENT |
|---|---|

FIG. 11  AST/CLA COMMAND

| TYPE | |
|---|---|

FIG. 12    QRY(1) MESSAGE

| ACP_TYPE | CALL_TYPE | OST |
|---|---|---|
| CONVERSATION ID ||| 
| ANI |||

FIG. 13    QRY(2) MESSAGE

| ACP_TYPE | NPA OXX-AABB |
|---|---|
| CONVERSATION ID ||

FIG. 14    RDY MESSAGE

| CALL_STATE |
|---|

FIG. 15    EXC

| FATAL/NONFATAL ||
|---|---|
| FAILURE TYPE | COMMAND POINTER |

FIG. 16    RENV

| DATA OR EXCEPTIONS |
|---|

FIG. 17    DONE MESSAGE
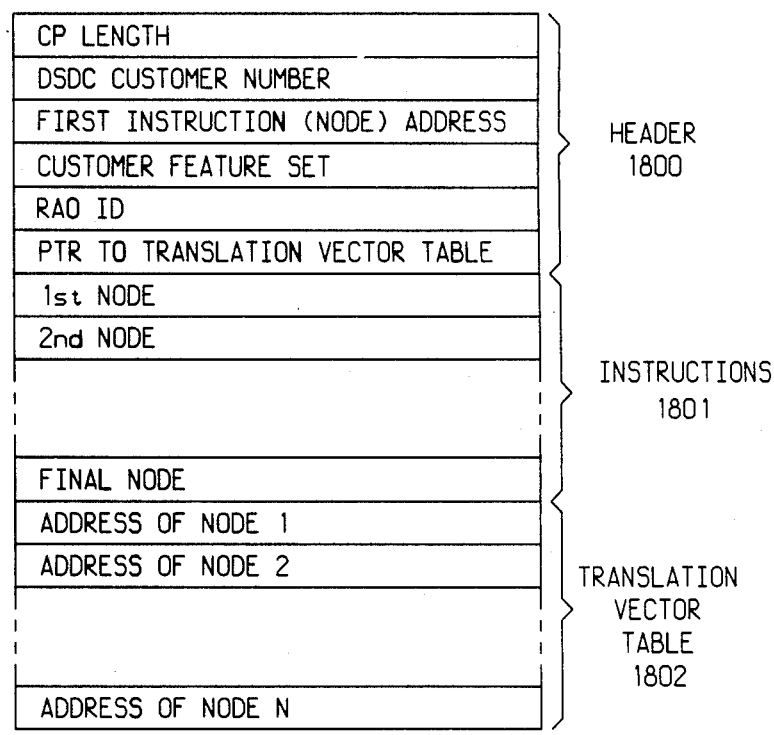
FIG. 18    CUSTOMER PROGRAM

FIG. 19

INTEGER/STRING DECISION NODE
REQUIRED CAPABILITY DECISION (WITHOUT P-EXP FIELD)

| NODE TYPE |
|---|
| PARAMETER EXPRESSION — 1901 |
| MAX. NO. OF OUTCOMES — 1902 |
| DEFAULT NODE — 1904 |
| OUTCOME 1 CHILD NODE |
| ⋮ — 1905 |
| OUTCOME N CHILD NODE |
| OUTCOME 1 VALUE |
| ⋮ — 1906 |
| OUTCOME N VALUE |

FIG. 20  SEQUENCE DECISION MODE

| NODE TYPE |
|---|
| STATUS VALUE — 2001 |
| NO. OF CHILD NODES — 2002 |
| CHILD 1 NODE |
| ⋮ — 2003 |
| CHILD N NODE |

FIG. 21  WHILE NODE

| NODE TYPE |
|---|
| STATUS VALUE — 2101 |
| MAX. ATTEMPTS — 2102 |
| CHILD NODE — 2103 |

FIG. 22  ANNOUNCEMENT NODE

| NODE TYPE | |
|---|---|
| NO. OF ANNOUNCEMENT NOS. | 2201 |
| ANN. TYPE(1 BIT PER ANNOUNCEMENT) | 2202 |
| ANN. NOS. OR DIGITS | 2203 |

FIG. 23  COLLECT NODE

| NODE TYPE | |
|---|---|
| VARIABLE TYPE / VARIABLE ID | 2301 |
| ANN NO. | |
| NO. DIGITS | 2302 |
| VOICEBACK | 2303 |
| ERROR TREATMENT | 2304 |

FIG. 24  SET BILLING OPTION

| NODE TYPE | |
|---|---|
| BOP (2401) / OPH (2404) | |
| IPC-INIT. PERIOD CALLER CHARGE | 2403 |
| OPC-OVRT. PERIOD CALLER CHARGE | 2404 |

FIG. 25  SET BILLING NO.

| NODE TYPE | |
|---|---|
| BILLING NO. | 2501 |

FIG. 26  CONNECT NODE

| NODE TYPE | |
|---|---|
| P-EXP. (DESTINATION NO.) | 2601 |
| DOMAIN (DOMESTIC/INTERNATIONAL) | 2602 |

FIG. 27 SET REQUIRED CAPABILITY NODE

| NODE TYPE |
|---|
| CAPABILITIES (1 BIT PER CAPAB.) ─2701 |

FIG. 28 SET VARIABLE VALUE NODE

| NODE TYPE | |
|---|---|
| VAR. TYPE ─2801 | VAR. ID ─2802 |
| P-EXP (GIVES VALUE OF VAR.) ─2803 | |

FIG. 29 RETURN STATUS NODE

| NODE TYPE |
|---|
| STATUS VALUE ─2901 |

FIG. 30 HANDOFF/SERVICE ASSIST NODE

| NODE TYPE |
|---|
| ID OF HANDOFF/ASSIST ACP ─3001 |
| P-EXP (HANDLING TYPE) ─3002 |

FIG. 31

PARAMETER EXPRESSIONS

INTEGER CONSTANT

| a | ID | NUMERICAL CONSTANT |

STRING CONSTANT

| b | ID | NO CHAR | CHAR 1 | CHAR 2 | - | - | - |
| | - | - | - | - | - | - | CHAR N |

VARIABLE 1

| c | ID | TYPE | ARG |

VARIABLE 2

| d | ID | TYPE | VAR_ARG |

FUNCTION

| e | ID | FUNCTION ARG |

FIG. 33

CUSTOMER RECORD

| NODE | HEADER |
|---|---|
| 1 | TYPE: INTEGER DECISION<br>DEFAULT NODE: 2<br>RANGE: 0<br>P-EXP: FUNCT/OST;PARA/ANI.<br><br>OUTCOME 1 NODE: 2<br>OUTCOME 2 NODE: 5<br>OUTCOME 1 VALUE: 1<br>OUTCOME 2 VALUE: 2 |
| 2 | TYPE: SEQUENCE<br>STATUS: 0<br>NO. CHILDREN: 2<br>CHILD 1: NODE 3<br>CHILD 2: NODE 4 |
| 3 | TYPE: SET BILLING OPT.<br>BOP: 1 |
| 4 | TYPE: CONNECT<br>NO.: 916-477-3000 |
| 5 | TYPE: INTEGER DECISION<br>DEFAULT NODE: 2<br>RANGE: 1<br><br>P-EXP: PARA/CALL TYPE<br><br>OUTCOME 1 NODE: 6<br>OUTCOME 2 NODE: 6<br>OUTCOME 3 NODE: 6<br>OUTCOME 1 VALUE: 0<br>OUTCOME 2 VALUE: 1<br>OUTCOME 3 VALUE: 5 |
| 6 | TYPE: SEQUENCE<br>STATUS: 0<br>NO. CHILDREN: 2<br>CHILD 1: NODE 7<br>CHILD 2: NODE 8 |

FIG. 34

CUSTOMER RECORD

| NODE | |
|---|---|
| 7 | TYPE: SET CAPABILITY<br>CAPABILITY: ANN. AND DIGIT COLLECTION |
| 8 | TYPE: SEQUENCE<br>STATUS: 3<br>NO. CHILDREN: 3<br>CHILD 1: NODE 9<br>CHILD 2: NODE 9<br>CHILD 3: NODE 23 |
| 9 | TYPE: SEQUENCE<br>STATUS: 0<br>NO. CHILDREN: 2<br>CHILD 1: 10<br>CHILD 2: 11 |
| 10 | TYPE: COLLECT<br>VARIABLE TYPE: PER CALL STRING VAR<br>VARIABLE ID: REGISTER 1<br>NO. DIGITS: 1<br>VOICEBACK: 1/ERROR TREATMENT=0<br>ANNOUNCEMENT ID |
| 11 | TYPE: STRING DECISION<br>DEFAULT NODE: 12<br>P-EXP: PARA/STRING VAR.;VAR ID = REG. 1<br>OUTCOME 1 NODE: 13<br>OUTCOME 2 NODE: 16<br>OUTCOME 1 VALUE: 1<br>OUTCOME 2 VALUE: 2 |
| 12 | TYPE: RETURN STATUS<br>STATUS: 3 |
| 13 | TYPE: SEQUENCE<br>STATUS: 0<br>NO. CHILDREN: 2<br>CHILD 1: NODE 14<br>CHILD 2: NODE 15 |
| 14 | TYPE: SET BILLING OPT.<br>BOP: 1 |

FIG. 35

CUSTOMER RECORD

| NODE 15 | TYPE: CONNECT<br>P-EXP: STRING CONST 916-477-1000 |
|---|---|
| 16 | TYPE: SEQUENCE<br>STATUS: 0<br>NO. CHILDREN: 3<br>CHILD 1: NODE 17<br>CHILD 2: NODE 18<br>CHILD 3: NODE 19 |
| 17 | TYPE: SET BILLING OPT.<br>BOP: 4<br>IPC: 10(10X.05=.50) |
| 18 | TYPE: SET BILLING NO.<br>BILLING NO.: 916-477-2000 |
| 19 | TYPE: STRING DECISION<br>DEFAULT NODE: 22(WESTERN U.S.)<br>P-EXP: FUNC/SUBSTRING(ANI,1,3)<br>OUTCOME 1 NODE: 20<br>⋮<br>OUTCOME X NODE: 20<br>OUTCOME 1 VALUE:<br>   207(MAINE NPA.)<br>⋮<br>OUTCOME X VALUE:<br>   813(S. FLORIDA NPA)    ALL NPA'S DEFINED AS EASTERN U.S. |

FIG. 36

CUSTOMER RECORD

| NODE | |
|---|---|
| 20 | TYPE: INTEGER DECISION<br>DEFAULT NODE: 22<br>RANGE: 1<br>P-EXP: PARA/TOW<br>    (EASTERN TIME ZONE, DST)<br>OUTCOME 1 NODE: 21<br>OUTCOME 2 NODE: 22<br>OUTCOME 3 NODE: 21<br>OUTCOME 4 NODE: 22<br>OUTCOME 5 NODE: 21<br>OUTCOME 6 NODE: 22<br>OUTCOME 7 NODE: 21<br>OUTCOME 8 NODE: 22<br>OUTCOME 9 NODE: 21<br>OUTCOME 10 NODE: 22<br>OUTCOME 1 VALUE: 1979 (MON 9 AM)<br>OUTCOME 2 VALUE: 2560 (MON 5 PM)<br>OUTCOME 3 VALUE: 3419 (TUE 9 AM)<br>OUTCOME 4 VALUE: 3900 (TUE 5 PM)<br>OUTCOME 5 VALUE: 4859 (WED 9 AM)<br>OUTCOME 6 VALUE: 5340 (WED 5 AM)<br>OUTCOME 7 VALUE: 6299 (THUR 9 AM)<br>OUTCOME 8 VALUE: 6780 (THUR 5 PM)<br>OUTCOME 9 VALUE: 7739 (FRI 9 AM)<br>OUTCOME 10 VALUE: 8220 (FRI 5 PM) |
| 21 | TYPE: CONNECT<br>P-EXP: STRING CONST 212-594-3200 |
| 22 | TYPE: CONNECT<br>P-EXP: STRING CONST 916-477-2000 |
| 23 | TYPE: ANNOUNCEMENT<br>ANN. TYPE: NON-DIGIT<br>ANN. ID: Y |
| | TRANSLATION VECTOR TABLE |

FIG. 48
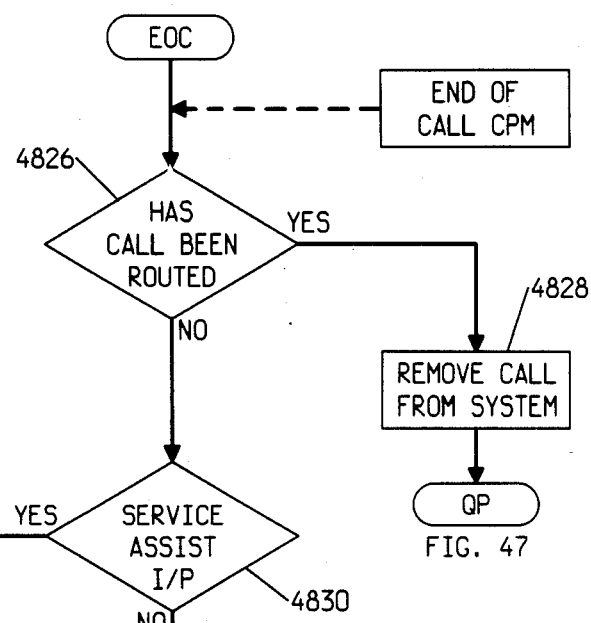
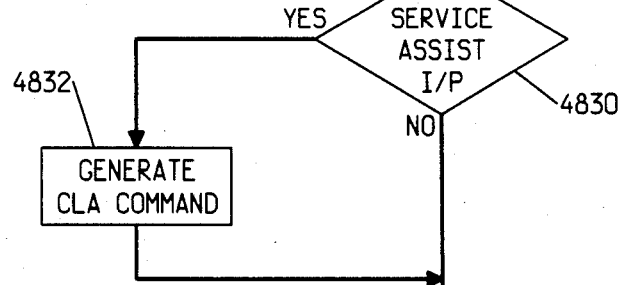

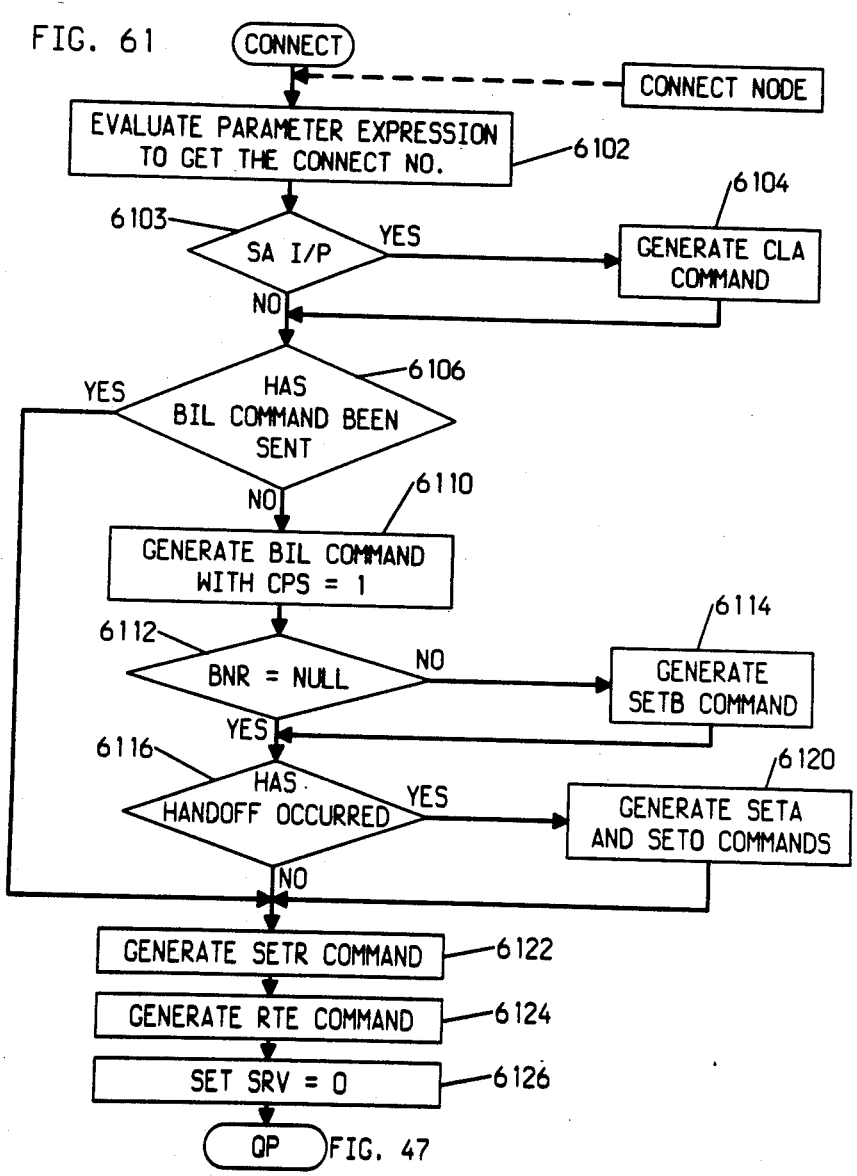

PER CALL MEMORY

| CALL PROGRESS MARK | | | | | | | |
|---|---|---|---|---|---|---|---|
| SA | HO | ACPT | | | | | |
| BCS | BOP | IPC | OPC | OPH | CPS | ABR | |
| BILLING NO. REG (BNR) | | | | | | | |
| ACPC | | | | | | | |
| CNID | | | | | | | |
| RSV | | | | | | | |
| REQUIRED CAPABILITY REG (RCR) | | | | | | | |
| HAF ARGUMENT | | | | | | | |

TELEPHONE OFFICE SERVICE ASSIST AND HANDOFF

CROSS REFERENCE TO RELATED CASE

This application has been filed simultaneously with application Ser. No. 557,128 entitled "Method for Customer Definable Telephone Capability" by R. L. Asmuth, R. M. Ermann, M. A. Gauldin, G. W. Gawrys, R. E. Stone and M. P. Yuhas.

TECHNICAL FIELD

The invention relates to telephone systems in general, and particularly it relates to arrangements by means of which the control of calls may be temporarily or completely transferred from one originating office to another office so that certain call processing capabilities may be obtained without the necessity of incorporating all capabilities in all offices.

BACKGROUND OF THE INVENTION

The above-mentioned related application describes an arrangement by means of which calls to a telephone customer may be originated by the dialing of a single number, yet allowing the customer to specify the disposition of calls based on an evaluation of selected call parameters at the time calls are initiated. This method is achieved by providing a customer defined program, a plurality of independent and discrete call processing capabilities in each originating office, and by executing some or all of the capabilities in an order specified by the customer program on a per call basis to achieve the desired telephone service for the customer.

As a practical matter, it is difficult and inefficient to require that all offices be able to perform all capabilities at any given time. This may be due to the unavailability of certain hardware features in some offices, to the cost of deployment of certain features in all offices, to different generic programs in different offices, and even to certain data that may be available in one office and unavailable in another. As one example, a customer may wish to specify that incoming calls be routed to alternative destinations based upon information supplied by a caller in the form of additional dialed digits. In this case, an appropriate prompting announcement must be made to instruct the caller. An airline, for example, may wish to instruct a caller to dial "1" for flight information and "2" for reservations. However, the office handling a call to the airline may not be equipped with the hardware capability necessary for making an appropriate prompting announcement to the caller, or perhaps the data defining the specific announcement is unavailable at the serving office.

It is a problem then to provide universal and homogeneous service to customers in a manner contemplated by the method and invention disclosed in the aforementioned Asmuth et al application irrespective of the location of callers and offices serving calls.

SUMMARY OF THE INVENTION

The above problem is solved and an advance in the state of the art is achieved in a method of controlling a telephone office serving a call to obtain a call processing capability unavailable in the serving office. A customer program is executed in response to the origination of a call to the customer. The program contains instructions for ascertaining specified prescribed parameters of the call and instructions specifying the performance of ones of a plurality of independent, primitive call processing capabilities for processing the call in accordance with the program and the call parameters. It is determined whether or not the serving office is able to perform all the capabilities required by the program to process the call. If not, stored information is examined to select a second office that is able to perform the capability unavailable at the serving office. The call is then extended to the second office to obtain the performance of the capability unavailable at the serving office. The call extension to the second office may be temporary, in which case the call connection to the second office is disconnected at some time after the performance of the capability and call control is returned to the serving office. This is referred to herein as a service assist. Alternatively, call control may be completely given up to the second office. In this case, the initial serving office operates much like a tandem office after the call extension. This mode of operation is referred to as a service handoff. In the preferred embodiment, the customer program resides at a centralized data base. The serving office and the second office receive commands from the data base over a common channel signaling network. The commands, among other things, control which call processing capabilities are performed by the offices and the call extensions and disconnections associated with service assists and handoffs.

BRIEF DESCRIPTION OF THE DRAWING

In the drawing,

FIG. 2 shows an illustrative format of messages transmitted between an ACP and an NCP;

FIGS. 3 through 11 show illustrative formats of the message body in FIG. 2 when the message is a command to an ACP from an NCP;

FIGS. 12 through 17 show illustrative formats of the message body for messages from an ACP to an NCP;

FIG. 18 shows an illustrative format of a customer program;

FIGS. 19 through 30 show illustrative formats of the different types of instructions (also called nodes) that might exist in a customer program;

FIG. 31 shows illustrative formats of parameter expressions specified in a customer program instruction (node) to be evaluated;

FIGS. 33 through 36 show the customer program of the flowgraph in FIG. 32 at the program would exist in an NCP;

FIGS. 47 through 74 show illustrative flowcharts of the program at an NCP; and

FIG. 75 shows an illustrative format of per call memory at an NCP used as scratch memory during the execution of a customer program for each call.

GENERAL DESCRIPTION

Figure 1:
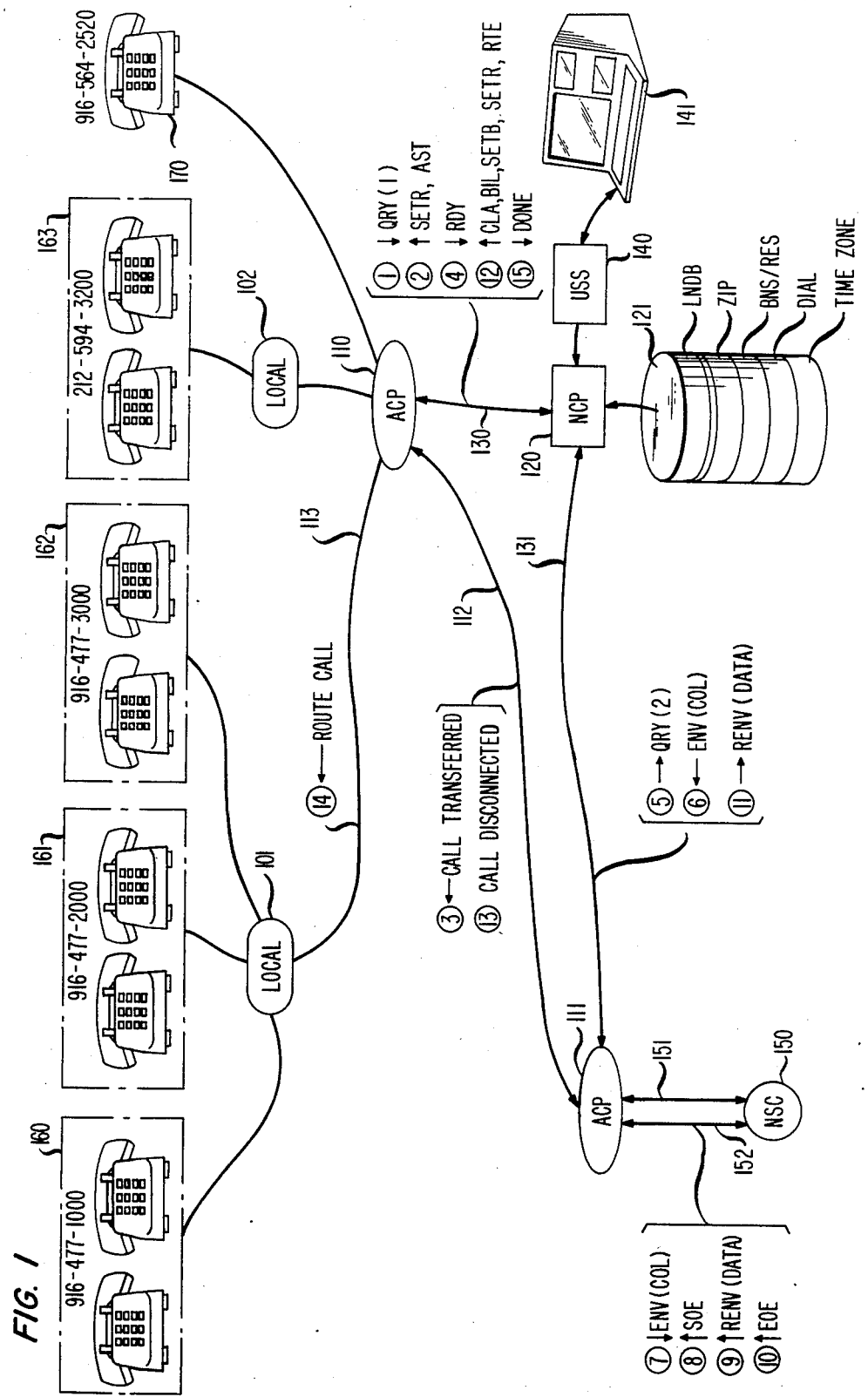
FIG. 1 is a geographical representation of the installations of a hypothetical corporate telephone customer and interconnections of the installations to the telephone network. Local telephone offices which directly service the installations in the figure are in turn connected to other switching offices called action points (ACPs). The ACPs are connected by a signaling network to centralized data bases referred to as a network control points (NCPs). The customer programs reside in and are executed by an NCP. The call processing primitives are executed by the ACPs in response to commands from an NCP. A network services complex (NSC) associated with an ACP performs announcements to and collects information digits from callers in response to commands from an NCP forwarded by the ACP.

The first digit of three digit designation numbers and the first two digits of four digit designation numbers refer to the drawing in which the designated item or step appears. Thus, item 120 appears in FIG. 1 and step 3802 appears in FIG. 38.

FIG. 1 is a geographical representation of a telephone system including local switching offices such as 101 and 102; Action Control Points (ACPs) such as 110 and 111; and a Network Control Point (NCP) 120. The ACPs are offices specially equipped to process calls in accordance with the invention. Calls so processed are called DSDC (Direct Services Dialing Capability) calls. The ACPs also serve as access points to the Common Channel Interoffice Signaling (CCIS) network. The CCIS network is a packet data switching network which interconnects the ACPs and NCPs by data links such as 130 and 131. Packet data switching facilities are well-known and are disclosed, for example, in A. G. Fraser U.S. Pat. No. 3,749,843 of July 31, 1973 and U.S. Pat. No. 3,979,733 of Sept. 7, 1976. The structure and operations of the CCIS network are described in 67 *Bell System Technical Journal*, No. 2, page, et seq.

An NCP is a centralized data base facility which, by way of example, may comprise a Western Electric Company, Incorporated 3B processor (disclosed in 56 *Bell System Technical Journal*, No. 7, February 1977), equipped with disk storage and a system of programs to establish, edit and manage information stored in its data memory. In reality, there are a number of NCPs in the network, each of which in general may contain the customer programs of different customers. For simplicity, only one NCP is shown in FIG. 1 and discussed herein.

To process DSDC calls, an ACP is equipped to perform any of a plurality of primitive, independent call processing capabilities which may be linked in a desired order on demand on a per call basis by some intelligent process to result in the proper disposition of each call. In accordance with the preferred embodiment of the invention, the intelligence is located in the data base of an NCP such as 120 in the form of a customer-defined program executable on a per call basis.

The customer program is initially defined in a user-friendly language by interaction between an off-line computer system referred to as the User Support System (USS) 140 and users at interconnected terminals such as 141. USS 140 compiles each customer program inputted in the user-friendly language into an interpretive object language and transmits the object language to an appropriate NCP such as 120 when the customer service is activated. The user-friendly language is intended to be easily understandable and usable by telephone customers. Although a customer program may be generated by telephone company personnel in consultation with the customer, the ultimate intention is to have the capability of terminals such as 141 located at the premises of customers and that such customers define and modify their telephone service directly at will.

After DSDC service is activated for a customer, the customer program at an NCP is executed in real time in response to each DSDC call to the customer. The customer program makes decisions based on certain parameters of each call specified by the customer program. The customer program generates commands which are transmitted to the associated ACP processing a call specifying the particular call processing capabilities to be performed and the order of execution of the capabilities to dispose of the call in accordance with the customer's program.

Certain decisions that must be made by an NCP require information pertaining to a caller. For this purpose, the NCP has access to a Line Number Data Base (LNDB) 121 which contains files addressable by the telephone numbers, or portions thereof, of callers. Illustratively, such files contain postal zip numbers of callers, time zones of callers, whether calls are made from business or residential stations and whether the callers are using dial pulse or tone signaling.

In general, it is possible to equip most recent types of toll and local offices to process DSDC calls. For purposes of this specification, it is sufficient to assume that the first offices (ACPs) to be equipped with DSDC capability will be the 4ESS TM toll offices manufactured by Western Electric Company, Incorporated, and in operation nationwide. DSDC calls will be routed via local, tandem and TSPS offices as required to an appropriate 4ESS office for access to an NCP via the CCIS network.

The structure and general operation of a 4ESS office is described in the *Bell System Technical Journal*, Vol. 56, No. 7, September 1977. Modifications and improvements to the basic 4ESS office are described in the *Bell System Technical Journal*, Vol. 60, No. 6, Part 2, July–August 1981.

Some, but not all, of the 4ESS offices in operation have both CCIS and digital voice trunk access to an independently operable subsystem referred to as the Network Services Complex (NSC). In FIG. 1, it is assumed that ACP 111 is associated with NSC 150, whereas ACP 110 is not associated with an NSC. The NSC is used, as will be described in detail herein, to provide certain DSDC capabilities, such as the capability to make announcements to callers and to collect information digits from callers. ACP 111 communicates with NSC 150 via CCIS data link 151 for control signaling purposes and via digital voice trunks 152 for announcements and digit collection. The NSC is described in U.S. patent application, Ser. No. 382,602, filed on May 27, 1982, by Herr et al, now U.S. Pat. No. 4,475,189. A data store within the NSC used to perform announcements to callers is described in detail in U.S. patent application, Ser. No. 380,511, filed on May 21, 1982 by T. W. Anderson et al, now U.S. Pat. No. 4,545,043.

As will be explained in detail, the primitive, independent call processing capabilities at an ACP include the capabilities to:

1. establish billing records for calls,
2. perform various announcements to callers,
3. prompt callers with instructions for inputting information digits from telephone keypads and to collect the information digits,
4. route calls to telephone numbers supplied by an NCP,
5. perform various types of final call disposition specified by an NCP other than routing to a call destination, and
6. perform service assists and handoffs of a DSDC call from an ACP serving the call to another ACP to obtain the performance of a required capability not available in the serving ACP.

The ACPs and NCPs communicate with each other by means of data messages transmitted via the CCIS network. The general format of such messages is shown in FIG. 2. A message contains two fundamental parts, a message header 200 and a message body 201. The format of the message body is discussed below for each of the individual types of messages pertaining to DSDC service. Since the CCIS network is used for applications other than DSDC, the header contains an application field APPL to identify the application for which the message pertains. For DSDC messages, a message type field MSG TYPE identifies the message contents as being either a command message from an NCP, or a message from an ACP to an NCP.

When a DSDC call is first received at an ACP, the ACP recognizes the call as a DSDC call as a result of a special SAC access code prefixed to a DSDC number identifying the customer. The ACP therefore knows that it must communicate with an NCP to obtain instructions for processing the call. At this point, the ACP does not know which NCP contains the customer program for controlling disposition of this call. Two CCIS routing domains are provided to solve this problem. The domain of a message is indicated in a DOMAIN field of the message header. The first DSDC message transmitted by an ACP to the CCIS network in response to a DSDC call is referred to as an initial inquiry, or QRY(1), and is transmitted in domain 1. Domain 1 uses the dialed DSDC customer number as an NCP address. Routing nodes (not shown) in the CCIS network translate the DSDC number in domain 1 to direct the QRY(1) to the appropriate NCP. The DSDC number is contained in an addressing field 202 of the header. The initial QRY(1) message from an ACP also contains a unique number identifying the ACP in a return address field 203. Each message between ACPs and NCPs also contains an indication of the length of the message in field LENGTH and a conversation number in field 204 to identify the call to which the message pertains. The conversation number is illustratively the trunk number on which the DSDC call arrived at the ACP.

The first message returned from an NCP to an ACP in response to a QRY(1) contains in field 203 of the header a number identifying the specific NCP in control of the call. All messages between the ACPs and the NCPs after the QRY(1) pertaining to the call are routed in domain 2. In this domain, the number identifying either the specific ACP or NCP to which the message is addressed is contained in field 202 and the return address number identifying the transmitting ACP or NCP is contained in field 203.

The general ACP call processing capabilities mentioned above may be invoked on any call by an NCP in a number of ways by commands to an ACP which include various options depending on the parameters of the call. The commands are contained in the message body 201 of FIG. 2. The formats of the message body for each command are shown in FIGS. 3 through 11. As seen in these Figures, each command has a TYPE field containing an identification of the specific type of command. Since the TYPE field is common to all the commands, it will not be discussed further. The specific commands as they relate to the above-mentioned capabilities are now discussed.

Billing Record

A billing record for a call is established at an ACP by a BIL (Make Billing Record) command whose format is shown in FIG. 3. In accordance with a feature of the invention, the cost of a DSDC call may be borne by the DSDC customer or shared between the customer and a caller. By way of example, billing charges for a call are partitioned into transport charges and value-added charges. The value-added component is billed to the customer. The transport component may be shared or borne entirely by the caller or customer, as the customer desires. To provide for this illustrative flexibility, a number of indicators are provided in the BIL command. The billing option parameter (BOP) specifies the allocation of transport charges between the caller and the customer. In the illustrative embodiment, any one of the following options may apply on any given call (depending on the call parameters) to a customer in accordance with the program defined by the customer:

(a) all transport charges are billed to the customer or to a special customer billing number,
(b) all transport charges are billed to the caller,
(c) a fixed transport charge is billed to the caller and the remainder to the customer or to a special customer billing number.

When transport charges are to be shared, items IPC (initial period charges to caller) and OPC (overtime period charges to caller) in the BIL command each contain appropriate numbers indicating the maximum charge for each type of period that is to be billed to the caller.

The items CFA (customer features available), CPS (call progress stopped) and ABR (announcements performed) relate to value-added charges. CFA contains a number that reflects the total number of a prescribed set of features, such as route the call according to the time of day or geographic location of the caller, that are contained in a customer program, but which may or may not be used on any given call to the customer. ABR contains a number indicating the number of announcements made to a caller on a given call. CPS contains an indication that the corresponding call has been routed to a destination number or that the call has been intentionally terminated and not allowed to proceed. In addition, the BIL command includes an identification of a regional accounting office (RAO) responsible for processing the billing records of a given customer.

In response to a BIL command, the ACP assigns a billing record from memory to the associated call and records the billing information contained in the BIL command in the billing record. Program linkages are activated to cause other information, such as answer and disconnect times, to be entered into the billing record at appropriate points of a call. The billing record is subsequently transferred to magnetic tape for later evaluation by the RAO. The RAO determines the charge for the call and the allocation of the charge between caller and customer, if any.

Ordinarily, the DSDC number of a called customer will be stored in a billing record and used by the RAO for billing purposes. Therefore, the billing record capability at an ACP automatically stores a customer's DSDC number in the billing record when it is established. Occasionally, however, a customer desires that billing be made to special number(s) for accounting purposes. This can be accomplished on a call selective basis in accordance with the customer program by the generation of an SETB (Set Billing Number) command subsequent to a BIL command. A SETB command contains a special billing number specified by a customer as shown in FIG. 4. The SETB command transmits the special billing number to an ACP where it is stored in the billing record in place of the DSDC number.

Announcements and Digit Collection

In the illustrative embodiment, the capabilities to perform announcements and to collect information digits from callers are provided by a network services complex such as NSC 150 in FIG. 1. Since an NCP communicates with an ACP, commands to accomplish announcements and digit collect actions are routed by the ACP to an NSC if the ACP is associated with an NSC. Otherwise, a service assist or handoff must be performed under the control of an NCP as will be discussed below. Each NCP is provided with information describing which ACPs are associated with NSCs and which are not. Assuming that an ACP is associated with an NSC, the routing of announcement and digit collect commands to the NSC is accomplished by means of envelope (ENV) messages to the ACP. An ENV message is identified as such by the MSG TYPE field in FIG. 2. An ACP recognizes an ENV message by means of the MSG TYPE field, reformats the header 200 information to a format expected by the NSC and retransmits the ENV on a CCIS data link such as 151 in FIG. 1 to the NSC. The ACP waits for appropriate responses from the NSC in the form of return envelope (RENV) messages and, then retransmits the RENV to an NCP.

The above-mentioned Herr patent application describes an NSC including a data store 125 used to generate announcements to callers and tone receiving apparatus 138 used to collect information digits from callers. The data store is described in even more detail in U.S. patent application, Ser. No. 380,511, submitted on May 21, 1982 by T. W. Anderson et al.

Informational announcements that a customer may wish to have performed to a caller at certain points in the processing of a call, or prompts for soliciting information digits from a caller for selective call processing or routing may be performed to callers in accordance with a customer program in several ways. When designing its program, a customer may select from a variety of complete announcements preprogrammed into an NSC. Each announcement is identified by an announcement number. In addition, a vocabulary consisting of commonly used words and short meaningful phrases, such as "Thank you" or "Please dial" are preprogrammed into an NSC and are also identified by announcement numbers.

An announce (ANN) command, shown in FIG. 5, from an NCP contains a single announcement number and requests an NSC to perform the specified announcement to a caller. However, a customer may tailor its own announcement by linking together selected ones of the preprogrammed words and phrases. A sequence announcement (SAN) command, shown in FIG. 6, provides this capability. It contains a plurality of announcement numbers and requests an NSC to perform all the specified announcements without hesitation between the individual announcements. In addition, arbitrary numerical verbal sequences may be performed by use of a digital announcement (DAN) command, shown in FIG. 7. The DAN command contains a plurality of digit identifiers arranged in the intended order of utterance. ANN, SAN and DAN commands may, of course, be generated in clusters in any desired order to allow great flexibility in announcement selection.

A collect (COL) command is used to collect information digits from a caller. The collection of information digits requires an initial prompting announcement to a caller, such as for example, "Please dial 0 if you wish the service department or 1 if you wish the sales department." The format of the COL command is shown in FIG. 8 and contains items specifying the number of digits to be collected, what action to take in the event of a caller dialing error, whether a verbal statement of the information digits received by the NSC should be given (voiceback) and one or more announcement numbers.

In response to a COL command, an NSC performs a single announcement or links the specified announcements in the same way as the ANN, DAN and SAN commands and then collects the number of digits specified in the COL command from the caller. When the digits are collected, they are returned to the NCP in an RENV message where they are used by the customer program to control the ultimate disposition of the call as will be seen.

Call Routing and Termination

After all caller interaction is done, announcements have been given, and billing has been designated, the NCP must tell the ACP how to dispose of the call. Two commands, RTE (Route The Call) and FIN (Final Treatment) shown in FIGS. 9 and 10 serve this purpose.

RTE and FIN are concluding commands. One of them will always be the last command to be received by an ACP from an NCP on a call. although there may be intermediate RTE commands, as will be seen, in connection with a service handoff.

Normally, a call will be routed to some customer-chosen destination number in accordance with the parameters of the call as determined by the NCP. The ACP is informed of this destination number by a Set Routing Number (SETR) command, shown in FIG. 4, from the NCP. The SETR command has the same format as the SETB command and is sent prior to the RTE command. The RTE command tells the ACP to route the call to the number supplied in a previous SETR command.

The FIN command terminates a call by some treatment other than by routing to a destination number. For example, a problem such as network congestion or a caller or system error, might occur in the processing of a call and make call routing impossible. The FIN command is shown in FIG. 10 and contains a field specifying the specific final treatment to be applied by the ACP. By way of example, the final treatments might be the application of different types of tones to a calling station to distinguish between conditions such as all circuits busy, vacant code, reorder, etc. In response to a FIN command, the ACP performs the action specified in the command and then takes steps to terminate communications with the NCP for this call.

A DONE message, shown in FIG. 17, is transmitted by a serving ACP to a controlling NCP as a final action after the execution of an RTE or FIN command. As shown in FIG. 17, there is no other information in the body of the DONE message. The message is used merely to inform the NCP that the ACP has completed the call as commanded.

An exception (EXC) message shown in FIG. 15 is transmitted to an NCP to report various types of failures or abnormalities encountered in the execution of commands. The message includes a failure type field and a pointer to the specific command in a command block on which the failure or abnormality occurred.

Service Assist and Handoff

Every ACP will not necessarily be capable of performing the same set of capabilities discussed herein at any given time. As was mentioned earlier, some ACPs are associated with a network services complex (NSC) which is used to perform announcements and to collect information digits from callers in response to commands from the NCP. Other ACPs may not be associated with an NSC. An ACP unassociated with an NSC is incapable of performing an announcement or a digit collection action in the illustrative embodiment. In other cases, the unavailability of a call processing capability may occur at an ACP as a result of equipment outages or as a result of ACP equipment and software modifications that are not introduced into all ACPs at the same time. Some ACPs may not have a specific announcement required by a customer program.

In most cases, a service assist is used to obtain a feature capability required to process a given call, but which is not available at the serving ACP. A service assist is a temporary transfer of the call from the serving ACP to another ACP which can perform the required capability.

In other cases, a complete transfer of the call to another ACP for completion is necessary or desirable. This is called a service handoff. For example, calls to a foreign destination must be completed via an international gateway office. Assuming that the international gateway office is an ACP, this would be an example of when a handoff from a serving ACP to the gateway ACP would be both necessary and desirable.

The assist (AST) command and the clear assist (CLA) command, shown in FIG. 11, are used to perform a service assist operation. The AST command directs an ACP to route a call to a number previously sent in an SETR command. In addition, since the service assist is a temporary operation, the serving ACP remains ready to reaccept processing of the call at a later time in response to a CLA command from the NCP.

The assist destination number sent to a serving ACP in an SETR command informs the ACP, through destination number translation, of the identity of an ACP selected for the service assist. When an assist (or handoff) call is initially received by a handoff/assist ACP, it queries the NCP for instructions. However, the NCP must have some means of associating (identifying) the query from a handoff/assist ACP with the call for which it issued an assist or handoff command. To perform this identification, a pool of 2-digit numbers is maintained at the NCP for each ACP. The 2-digit numbers are assigned individually to calls that are subjected to a service assist. The call identifying digits are concatenated with other digits to form a service assist destination number of the form NPA-OXX-AABB, where NPA (numbering plain area) refers to area code digits as in the current nationwide numbering plan. The X, A and B digits can be any value from 0 to 9. The NPA-OXX identifies the call as a service assist call to an assisting ACP when it receives the call. The AA digits identify the controlling NCP. The BB digits are the call identifying digits mentioned above assigned by the controlling NCP. The NPA-OXX combined with the BB digits uniquely identify the particular call so that an NCP may control up to 100 assisted calls simultaneously at any given assisting ACP.

In response to an AST command, the serving ACP sends a RDY (ready) message, whose format is shown in FIG. 14, to the NCP when it is ready to execute the assist. The serving ACP then seizes an appropriate outgoing trunk and routes the call to the ACP identified in the assist destination number by outpulsing the destination number on the seized trunk to the assisting ACP. The assisting ACP recognizes the call as an assist request and, in response transmits an inquiry message, referred to as a QRY(2), whose format is shown in FIG. 13, to the NCP identified in the AA digits of the assist destination number. The QRY(2) informs the NCP that the assisting ACP has received the call and requests instructions from the NCP. As shown in FIG. 13, the QRY(2) message contains the conversation number (the incoming trunk identification) of this call in the assisting ACP and the NPA-OXX and BB digits. The NPA-OXX-BB digits identify for the NCP which call among all the calls currently in progress at the NCP to which the QRY(2) pertains.

At this point, the BB digits are made available by the NCP for assignment to another call which is to be subjected to a service assist or handoff. After the NCP receives the QRY(2), it transmits commands to the assisting ACP to have the capability not available at the serving ACP performed. The service assist will be maintained for as long as possible so that the assisting ACP will receive and perform most subsequent commands on the call. However, since a billing record is maintained at the original serving ACP, the assist must be cleared before processing of the call is completed. Specifically, the assist is cleared when a CONNECT node is encountered, before a FIN command is transmitted, and when a subsequent capability is required which the present assist ACP is unable to perform. When any one of these three instances occur, the NCP sends a CLA (clear assist) command to the original serving ACP. The conversation number in item 204 of the message header CLA command identifies the call to be cleared to the serving ACP. In response to the CLA command, the serving ACP releases the trunk connection to the assisting ACP and prepares itself to receive further commands from the NCP pertaining to the call.

A service handoff is effected by transmitting the NPA-OXX-AABB handoff routing number from a controlling NCP to the serving ACP in a SETR command. An RTE (route the call) command is then sent to the ACP, in contrast to an AST command, to cause the call to be routed by the serving ACP to the selected handoff ACP. The handoff ACP recognizes the call as a handoff call by virtue of the NPA-OXX digits. In response, it sends a QRY(2) message to the controlling NCP and then stands ready to receive commands to process the call further.

Because of possible equipment outages and other difficulties at an assisting or handoff ACP, which are not known by a controlling NCP, an assisting or handoff ACP may not, in fact, be capable of performing all capabilities required to process the call. In this case, additional service assists or handoffs may occur to other ACPs to achieve the required capability. Further details of these operations are provided below.

A final type of message that may be sent from an ACP to the NCP is an exception (EXC) message shown in FIG. 15. This message is used to report any type of abnormality in command execution by an ACP to the NCP. An abnormality may be classified as fatal or nonfatal to the progress of the call. An indication of the type of failure is included in the message. In addition, a pointer is included in the message which indicates which command, if more than one command was indicated in a transmittal from the NCP, on which the failure occurred.

Detailed Description

With reference to FIG. 1, we have chosen to illustrate our invention in detail by means of a hypothetical corporate customer and an illustrative customer program which might be suitable for such a customer. It is assumed that the customer has corporate locations 160, 161 and 162 on the west coast and a single location 163 on the east coast. For simplicity, it is further assumed that the corporate locations are served by private branch exchanges or automatic call distributors (not shown). The corporate telephone numbers at the locations 160, 161, 162 and 163 are assumed to be, respectively, 916-477-1000, 916-477-2000, 916-477-3000, and 212-594-3200. We will describe the invention by assuming that a call is placed from an individual station 170 on the west coast whose number is assumed to be 916-564-2520 to the DSDC number of the corporate customer. Before beginning the description, however, it is desirable to first discuss the details of customer programs at an NCP in general and the assumed program for the hypothetical corporation in particular.

FIG. 18 shows the general organization of a customer program as it would be stored in memory at an NCP. The program contains a header 1800, a section 1801 containing the program instructions (or nodes) and a translation vector table 1802. Each header contains information specifying the length of the program, the DSDC number of the customer, the address of the first instruction (node) of the program contained in section 1801, a feature set describing specific features selected by the customer which might be used on any given call to the customer, an identification of a regional accounting office (RAO) responsible for billing the customer and an address pointer to the translation vector table 1802.

Section 1801 contains the actual instructions of the customer program. Each instruction is referred to as a node. The first instruction of a program is referred to as the root node. The nodes are further classified as action nodes and decision nodes. The nodes are generally of variable length. The beginning of each node is located by means of the translation vector table 1802 which contains the addresses of the nodes.

The different types of nodes are shown in FIGS. 19 through 30. It is understood that these node types are illustrative only and that different and additional types could be defined to achieve purposes all within the spirit and scope of the invention. Each node type contains an initial item identifying the node type. This item will not be mentioned further in the description of the various node types.

Decision nodes control the flow through a customer program on any given call. A decision is made among other ways by an evaluation of a parameter expression contained in a decision node. The parameter expression may be classified as an integer expression or as a string expression.

Integer/String Decision Node

This type of node is illustrated in FIG. 19. A parameter expression to be evaluated is contained in item 1901. The formats of illustrative types of parameter expressions chosen for this embodiment of the invention are shown in FIG. 31. The ID item in each of the expressions in FIG. 31 identifies the type of parameter expression with which it is associated. FIG. 31a shows an integer constant type of parameter expression in which is stored a constant numerical value. FIG. 31b shows a string/constant type of expression. Encoded information representing a constant string of characters is stored in items CHAR-1 through CHAR-N. The length of the string is arbitrary and variable. Item NO—CHAR specifies the number of characters in the string.

The remaining parameter expressions in FIGS. 31c through 31e are used to specify variable decision arguments. The VARIABLE 1 expression in FIG. 31c is used to specify the evaluation of certain call parameters identified by the item TYPE. Decisions are made on the basis of the evaluation of the variable as will be explained below. Illustrative types have been selected for the preferred embodiment as follows:

| TYPE | MEANING |
|------|---------|
| 1 | Determine call class |
| 2 | Determine ANI |
| 3 | Determine time of day-observe daylight savings time |
| 4 | Determine time of day-do not observe daylight savings time |
| 5 | Determine time of week-observe daylight savings time |
| 6 | Determine time of week-do not observe daylight savings time |
| 7 | Determine day of week-observe daylight savings time |
| 8 | Determine day of week-do not observe daylight savings time |
| 9 | Determine day of year-observe daylight savings time |
| 10 | Determine day of year-do not observe daylight savings time |
| 11 | Fetch arfument n |
| 12 | Generate character string CCDDE where CC = fixed billing charge DD = per minute billing charge E = BOP (billing option parameter) |
| 13 | Determine type of calling station |
| 14 | Test the billing option parameter |

The ARG field of VARIABLE 1 in FIG. 31c is meaningful only for the above variable types 3 through 11. For types 3 through 10 ARG contains an indication of the time zone (Atlantic, Eastern, Central, Mountain, Pacific and Alaska/Hawaii) to be applied in making the specified time evaluation.

For type 11, ARG contains an integer identifying stored value to be passed to a subprogram.

The class of call, as specified by type 1 above, is illustratively partitioned into the following classifications:

| CLASS | MEANING |
|---|---|
| 0 quotation | 1+ noncoin without automatic charge |
| 1 | 1+ coin |
| 2 | 0+ |
| 3 quotations | 0− noncoin without automatic charge |
| 4 | 0− coin |
| 5 | 1+ with automatic charge quotation |
| 6 | 0− with automatic charge quotation |

0 in the call classes above means that the initial digit dialed by a caller is 0 to request either operator handling or special billing, such as in Automatic Calling Card Service as discussed in the aforementioned Mearns patent. 0− means that only the digit 0 is dialed. 0+ means that the 0 digit is followed by the dialing of all digits of a called number. Automatic charge quotation refers to a Traffic Service Position Subsystem arrangement for automatically quoting call charges to coin station callers and to other callers on request.

Parameter type 13 specifies that a decision is to be made based on the type of the calling station, i.e., dial pulse or pushbutton tone signaling. This type of decision is also referred to as OST (Originating Station Treatment).

Finally, type 14 specifies that a decision is to be made on the state of billing options pertinent to this call.

The format of a VARIABLE 2 parameter expression used to identify string or integer variables is shown in FIG. 31d. Item TYPE identifies whether the variable is a per call, per customer, or per NCP variable. In addition, TYPE identifies whether or not it is a string or integer variable. A per call variable is relevant only with respect to a specific call and may not be accessed on another call. In other words, if a customer program is actively controlling two calls at the same time, different but associated per call variables will be generated for each call. At the beginning of a call, a per call variable is empty (string) or 0 (integer). Information is loaded into the variable and used in accordance with the instructions of the customer program during the processing of the call.

Per customer variables are predefined variables accessible with respect to any call in progress under control of the customer program. Per NCP variables are predefined variables which are accessible with respect to any call being processed by the NCP. The variable argument item VAR_ARG of FIG. 31d contains an indication of the address of the variable in question. The contents at that address may be the variable itself or an address which points to the variable. Which of these latter two cases applies is determined by the contents of item ID of FIG. 31d.

FIG. 31e illustrates the format of a parameter expression which specifies the evaluation of a predefined function. A function returns a value of a specified function based on the attributes included in the function call. The evaluation of a function yields a value which is either an integer or string. By way of example, the following are predefined functions which may be called on demand by a customer program in the illustrative embodiment:

1. ZIP [ARG]

ZIP returns a postal zip code associated with a calling number. The calling number is specified in the function argument field ARG as a string valued expression. The postal zip numbers is obtained from the line number data base (LNDB) shown in FIG. 1.

2. BUSINESS/RESIDENCE [ARG]

This function determines if a calling station is a business or residence station. The LNDB is addressed with the calling station number expressed as a string parameter. An integer value is returned to differentiate between business and residence stations.

3. OST [ARG]

The OST (originating station treatment) function determines the type of signaling used by a calling station. The LNDB is addressed with the calling station number expressed as a string parameter. The possible query results are: dial pulse signaling, pushbutton tone signaling, and cannot be determined.

4. TIME ZONE [ARG]

This function returns an integer identification of the time zone in which a calling station is located. The identification is obtained from the LNDB and represents one of the world time zones.

5. WIRE CENTER [ARG]

A wire center is an arbitrarily defined geographic area within a given numbering plan area. This function returns an arbitrarily assigned integer which identifies a defined wire center. The NCP determines the wire center number from the calling station number using data stored in the LNDB.

6. SUM [ARG]

This function calculates the sum of two integers specified in the argument field.

7. DIFFERENCE [ARG]

This function calculates the difference between two variables specified in the argument field.

8. PRODUCT [ARG]

This function calculates the product of two integers specified in the argument field.

9. QUOTIENT [ARG]

This function returns the largest integer less than or equal to the quotient of a dividend and a divisor specified in the argument field.

10. CONCATENATE [ARG]

This function concatenates two string variables specified in the argument field.

11. SUBSTRING [ARG]

This function returns a substring of a string parameter specified in the argument field in which the substring begins and ends at string characters whose positions are also specified in the argument field.

12. STRING LENGTH [ARG]

This function determines the number of characters in a string specified in the argument field.

13. STRING TO INTEGER [ARG]

$$\sum_{1}^{N} X(i^{} \times (10^{})(n - i)),$$

where x(i) is the $i^{th}$ character of a string specified in the ARG field.

This function is used to convert a string of numerical characters to an integer equivalents.

We now return to our discussion of the integer/string decision node shown in FIG. 19. Each possible outcome or range of outcomes of the evaluation of the parameter expression in 1901 is stored in 1906. Assuming that there are N possible outcomes, then the addresses of N associated children nodes are stored in 1905. The appropriate outcome value corresponding to the evaluation of the parameter expression is located and the corresponding child node is obtained from 1905. This child node will be the next node to be executed in the customer program. Word 1902 contains the maximum number of outcomes that are possible as a result of the evaluation of the parameter expression. Word 1904 contains the identity of a default node which will become the output node in the event evaluation of the parameter expression of 1901 does not match any of the outcome values in words 1906. After a child node is executed, it returns a status value to its parent node which, in turn, returns the status value to its parent.

Sequence Decision Node

FIG. 20 shows the format of a sequence node. A sequence node is used to execute sequentially separate branches of the sequence node. A branch consists of one or more nodes arranged to accomplish a specific function. Specifically, the beginning node of the first branch to be executed is specified by the child 1 node address in words 2003. The result of execution of a branch returns a status value to the sequence node depending upon the results of execution of that branch. The returned status value is compared to the status value contained in word 2001 of the sequence node. If the returned value and the status value do not match, or the child node requested in the last node of a significance node, the sequence node returns to its parent the status value of the last child node executed. The last branch (beginning with child node N in words 2003) is immediately executed, thereby skipping execution of all the remaining intermediate branches (if any).

While Decision Node

This type of node is illustrated in FIG. 21. This node provides a general looping ability by repeatedly executing a program branch beginning with the child node specified in word 2103 until either the maximum number of attempts specified in word 2102 is reached or until the child node returns a status value other than that specified in word 2101. When either occurs, the status value last returned by the child node is returned to the node's parent.

Announcement Node

The format of an announcement node is shown in FIG. 22. This type of node causes the generation of ANN, SAN or DAN commands in accordance with the information stored in the node. Word 2203 contains one or more announcement numbers identifying announcement segments and/or specific digits to be announced to a caller. Word 2202 contains information identifying each number in word 2203 as an announcement number or a digit string in the form of a string parameter expression. The number of announcement numbers and digits contained in word 2203 is contained in word 2201.

Collect Node

A collect node, shown in FIG. 23, causes the generation of a COL command which in turn results in the performing of specified announcements to and the collection of information digits from a caller.

Set Billing Option (SBO) Node

The format of this node is shown in FIG. 24. Its purpose is to cause the generation of a BIL command which, it is recalled, causes an ACP to assign a billing record for a call.

Items 2401 and 2402 contain the BOP (billing option) and the OPH (operator handling) parameters, respectively, mentioned above with respect to the BIL command. Items 2403 and 2404 contains, respectively, an indication (IPC) of the fixed initial period charger, if any, and an indication (OPC) of the overtime charges, if any, to be billed to a caller.

Set Billing Number (SBI) Action Node

This node, shown in FIG. 25, causes the generation of a SETB (set billing number) command. It is recalled that the SETB command instructs an ACP to enter the specified billing number into a billing record created as a result of a BIL command. The billing number is specified in item 2501 of the node.

Connect Node

This node, shown in FIG. 26, causes the generation of SETR (set destination number) and RTE (route the call) commands). The destination telephone number to which the call is to be routed and which is placed in the SETR command is specified in item 2601 of the node as a string constant parameter expression. A domain item 2602 of the node contains an indication as to whether an ACP should route domestically or internationally.

Set Required Capability Node

This node, shown in FIG. 27, is used to establish early in the initial processing of a call a list of capabilities which may be required to process the call according to the customer program. Item 2701 of the node contains a bit string in which each bit represents a capability and the state of each bit represents whether or not that capability may be required. The bit states are established by the USS at the time the customer program is compiled.

Set Variable Value Node

This node, shown in FIG. 28, instructs an NCP to insert a specified value into a per call, per customer or per NCP variable. The variable type (per call, per customer or per NCP) is specified in item 2801. The value of the variable is specified by a parameter expression in item 2803. The identity (address) of the variable into which the evaluated parameter expression is to be placed is contained in item 2802.

Return Status Node

The results of execution of any node in a customer program is specified by the return of a status value from that node to the parent node. The use of returned status values will become clear during the discussion of a detailed illustrative example below. For the time being, it suffices to say that the Return Status Node, shown in FIG. 29, is used to force the return of a particular status value to a parent node to control the flow through a customer record in a particular way. The status value is specified in item 2901 of the node.

Handoff/Service Assist Action Node

This node type is illustrated in FIG. 30. The handoff/service assist node may be found in a customer program or a common subprogram. A common subprogram is a program which is available for execution as part of any other customer program as dictated by the circumstances of a call. A handoff/service assist subprogram is executed at an appropriate time as part of a customer program, if, for example, an action node is encountered in the execution of the customer program which requires the performance of an ACP capability no available at the processing ACP. In this case, an appropriate handoff/assist subprogram is executed. A handoff/service assist node in such a subprogram contains a parameter expression in item 3002 specifying whether the action to be performed is a handoff or service assist. In addition, an item 3001 specifies the NPA-OXX of an appropriate assisting ACP to perform the capability not available in the processing ACP. The NPA-OXX is used to address a pool of BB numbers for the assisting ACP. The next available BB number is assigned to this call for identification purposes and the resulting NPA-OXX-AABB number (where AA identifies this NCP) is sent to the processing ACP in a SETR command followed by an AST command for a service assist or a RTE command for a service handoff, as priorly discussed.

Required Capability Decision Node

The format of this type of node is identical to the format of an integer/string decision node shown in FIG. 19 without, however, the parameter expression in item 1901. The purpose of the required capability decision node is to locate an ACP having all the capabilities listed in the required capability register (RCR) of FIG. 75.

With the above as introductory background, we return now to the discussion of our hypothetical corporate customer. For purposes of illustrating the operation of our invention, we have assumed that the corporate customer wishes its incoming calls to be processed as follows.

Since interactive dialing is not convenient between an NSC and a customer calling from a pulse signaling telephone, such callers are to be given toll free service and their calls are to be routed to the west coast office 162 in FIG. 1 at the number 916-477-3000. Callers at pushbutton tone stations who have requested either operator handling or special billing (i.e., all calls preceded by the dialing of the digit 0) are treated as if they were dialing from rotary dial stations. Callers at pushbuttons dual-tone stations not requesting operator handling or special billing (i.e., call types 0, 1 and 5 mentioned above), are given more tailored interactive treatment. Specifically, callers wishing to speak to the Reservations Department are given toll free service and connected to the west coast reservations office 160 at number 916-477-1000. Callers who wish to speak to the Information Department are to share with the corporation a fixed charge of 50 cents for each such call. The corporation's share of the charge for each of these calls is to be billed to the west coast information office 161 at number 916-477-2000 for accounting purposes. However, to minimize transport charges, information calls are routed to either a west coast or an east coast office, depending on the time and place of call origination.

In this hypothetical example, the east coast office 163 is open only during weekdays from 9:00 a.m. to 5:00 p.m. Therefore, the corporation has decided to route all calls from area codes east of the Mississippi River and occurring during 9:00 a.m. and 5:00 p.m. Monday through Friday to the east coast office 163 at number 212-594-3200.

All other information calls are to be routed to the west coast office 16 which is open 24 hours every day.

Figure 32:
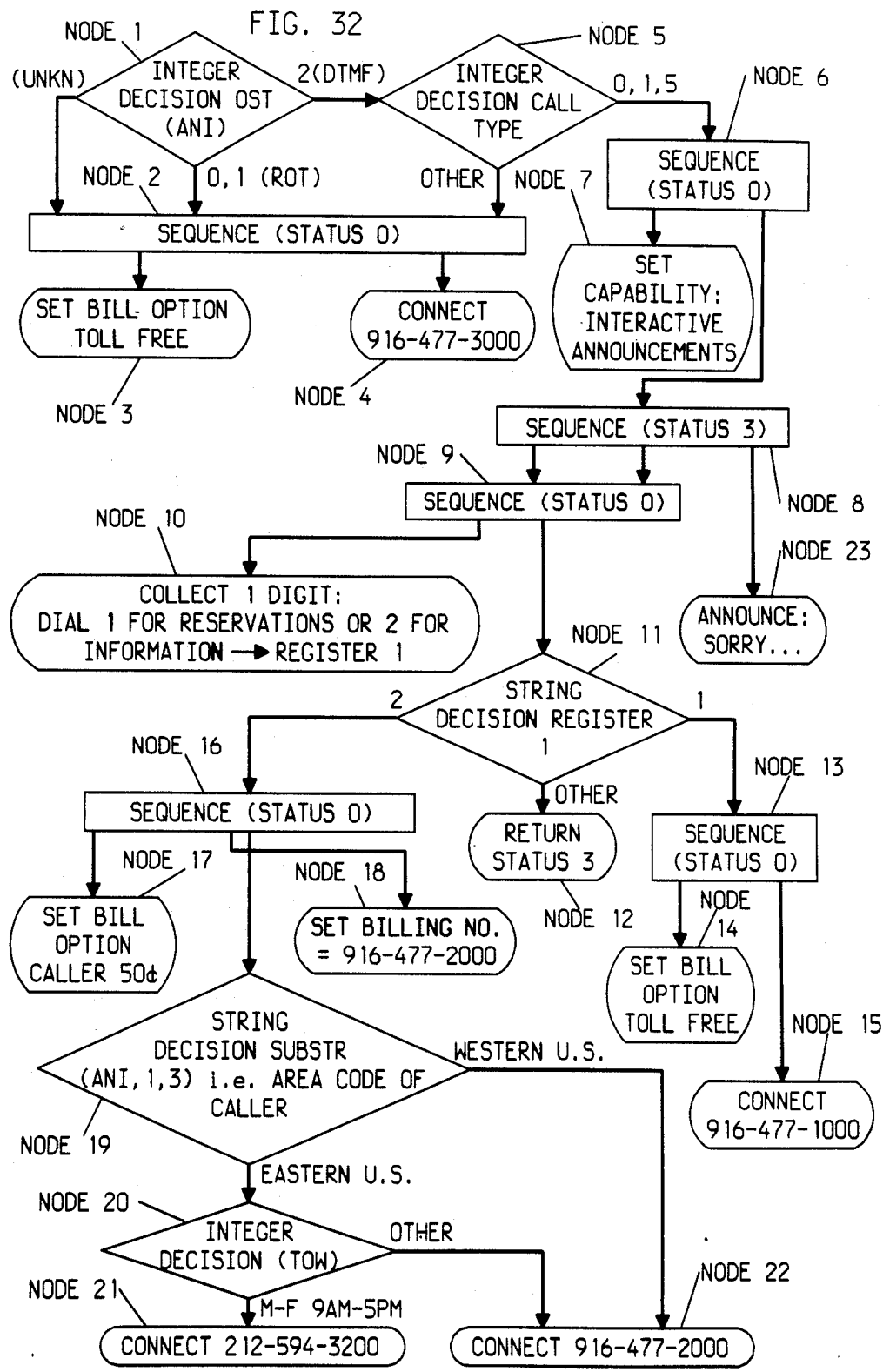
FIG. 32 is a flowgraph depicting the nodes of an illustrative customer program that might be specified by the hypothetical customer of FIG. 1.

An illustrative customer program to provide the above desired service for the hypothetical corporation is shown in state diagram form in FIG. 32. The corresponding program as it would exist in memory at an NCP is shown in FIGS. 33 through 36.

Figure 38:
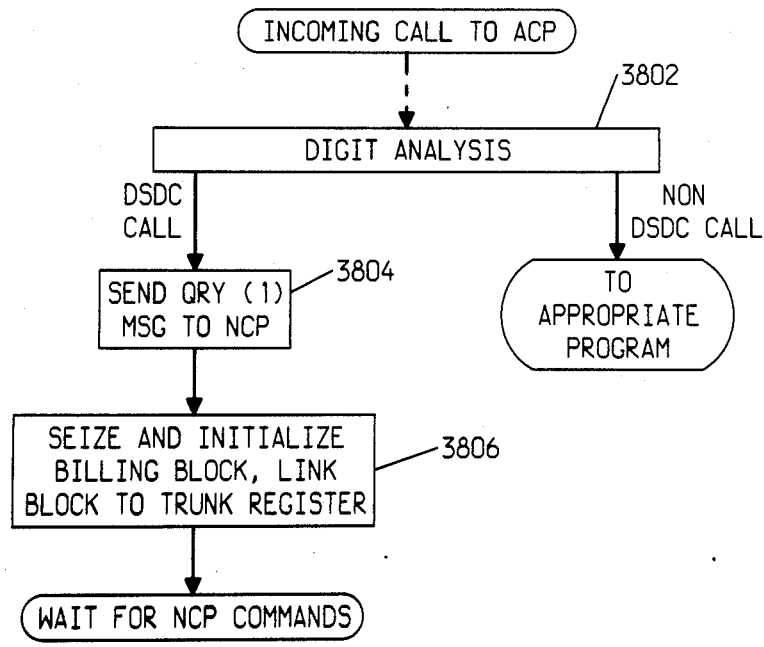
FIGS. 38 through 41 show illustrative flowcharts of the program at an ACP.

Assume now that a caller at station 170 in FIG. 1 places a call to the corporate customer. The purpose of the call will be discussed at the appropriate times in the discussion below. The caller begins by dialing 0 or 1+SAC+NXX+YYYY. "SAC" is the special access code which identifies this call as a DSDC call. The digits, "NXX+YYY" identify the corporate customer. With reference to FIG. 38, ACP 110 recognizes the "SAC" prefix as a DSDC call in a digit analysis step 3802 and generates and transmits a QRY(1) message in step 3804 to the appropriate NCP via a path 130 (FIG. 1) of the CCIS network. This transmittal is indicated in FIG. 1 by the encircled step 1. Path 130 leading to the appropriate NCP is identified and selected by a translation of the DSDC number NXX-YYYY.

As shown in FIG. 12, the QRY(1) message identifies the ACP type, the call type and the originating station treatment (OST), and contains a unique conversation identifier, which is illustratively the trunk number on which the call arrives, and the number of calling station 170(ANI). The ACP type is a number that identifies the switching office type, e.g., a Traffic Service Position System (TSPS), together with the capabilities the office is equipped to perform. The call type was discussed earlier and will not be repeated here. For specificity, we assume that the call is a type 0 call, illustratively meaning a 1+ noncoin call. We assume further that the ACP type for ACP 110 indicates a 4ESS office not associated with an NSC and therefore not able to perform announcements and digit collect operations. The OST field of the QRY(1) message illustratively contains, respectively, 0, 1 or 2 if the signaling used by the calling station is, respectively, unknown, pulse or pushbutton tone. We assume that station 170 has pushbutton tone signaling (OST type 2).

Figure 42:
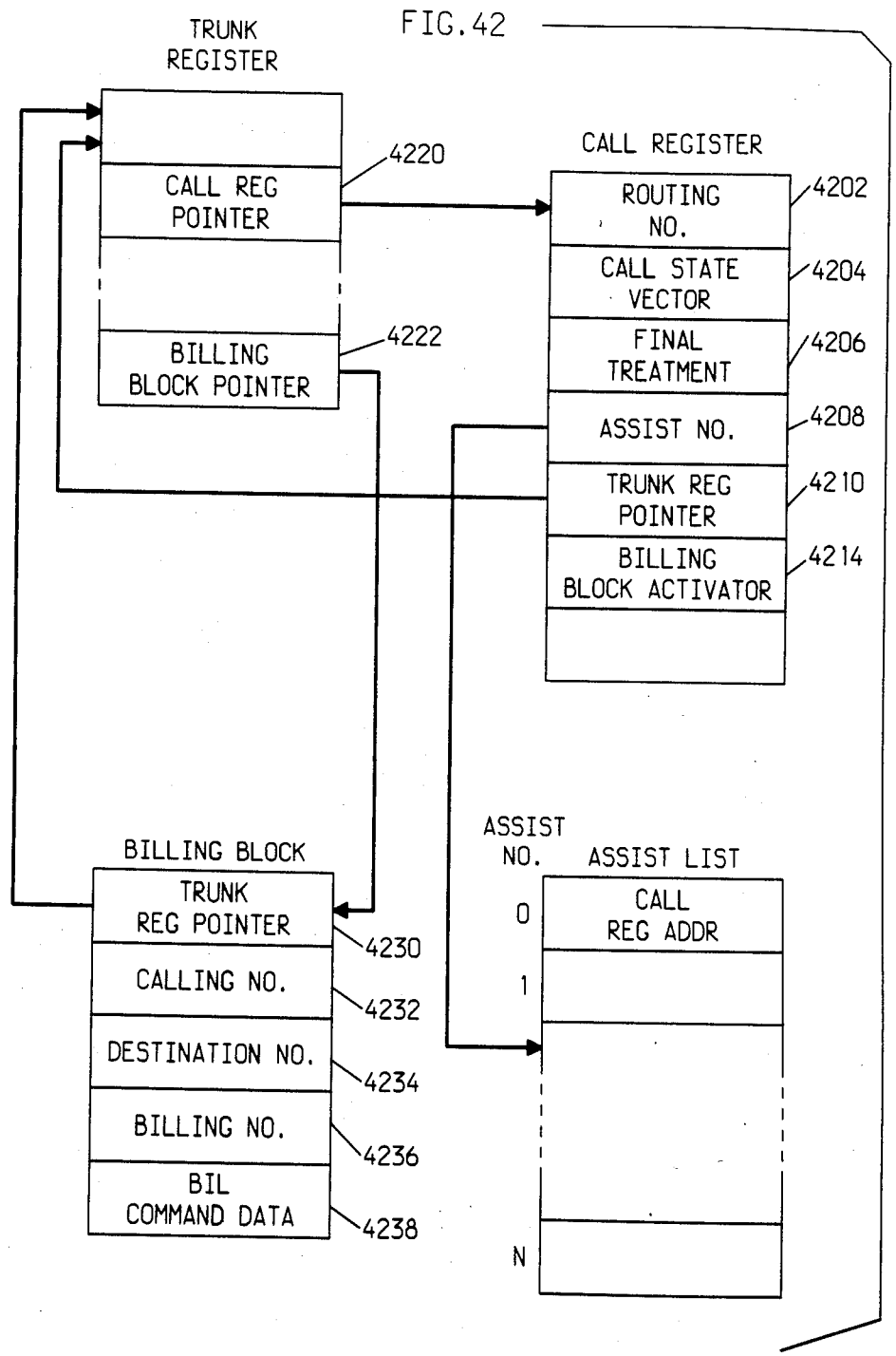
FIG. 42 shows illustrative formats and interrelationships of trunk registers, call registers, billing blocks and an assist table at an ACP which associates commands from an NCP with a specific call involved in a service assist or handoff.

Returning to FIG. 38, after the QRY(1) message is transmitted, ACP 110 in step 3806 then seizes and initializes a billing block for recording billing details of this call. The block is linked to the trunk register assigned for this call. The use of trunk and call registers to maintain temporary storage of call related data is well understood in the telephony art and will not be discussed in detail here. Typically, every call in an office is assigned a call register for the duration of the call. Calls associated with an incoming or outgoing trunk are also assigned a trunk register. The call and trunk registers are linked to each other. FIG. 42 shows the linking of a call register, a trunk register and a billing block in this preferred embodiment. FIG. 42 also shows information stored in these registers which is relevant to the invention and which will be discussed at the appropriate time. For now, a trunk register pointer 4210 in the call register points to the beginning of the trunk register which is assigned to this call. A call register pointer 4220 in the trunk register points to the beginning of the assigned call register. The trunk register also contains a billing block pointer 4222 which points to the beginning of the assigned billing block. The billing block is, in turn, linked back to the trunk by the trunk register pointer 4230.

After the QRY(1) transmittal and initialization of the billing block performed by the program in FIG. 38, the ACP proceeds to perform work related to other calls and functions while it waits for instructions from the NCP pertaining to this call.

At the NCP, a message processing routine (not shown) identifies the types of incoming messages and places QRY(1) messages into a new call queue and other types of messages into a response queue. Query processing is begun by the routine shown in FIG. 47 which is entered periodically. At steps 4702 and 4704, if both the response and new call queues are empty, the query processing program exits so that the NCP may perform other work.

Figures 47, 50:
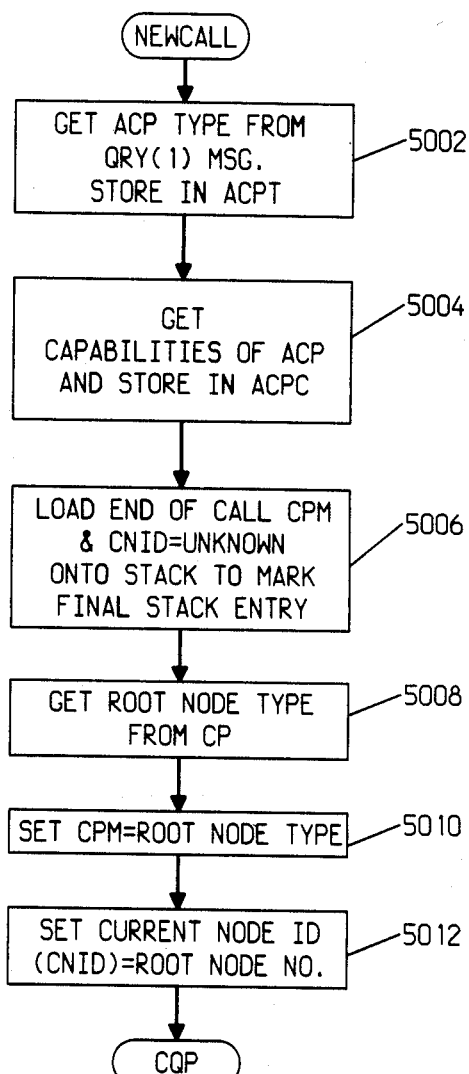

Assume now that the QRY(1) message for our example is next in the new call queue and that the response queue is empty. Steps 4706 and 4708 retrieve the dialed DSDC number of the hypothetical customer in this example and use it to identify the address of the customer program (CP). A call progress mark (CPM) identifying a new call is pushed onto a new call stack (not shown) along with a customer node identification (CNID). Normally, the stack CNID contains an identification of the next node to be executed. At this initial point of NCP processing, the stack CNID is set to a state "unknown" by step 4710. Next, steps 4712, 4714 and 4716 remove the entry from the stack and place the present CNID and CPM into the appropriate fields of per call memory shown in FIG. 75. Step 4718 then generates the address of an appropriate routine from the CPM and transfers control to this routine. For new call CPMs, control is transferred to NEWCALL in FIG. 50.

Step 5002 of NEWCALL obtains the ACP type from the QRY(1) message and stores it in ACPT of the per call memory. The capabilities of ACP 110 are obtained from a mapping table (not shown) addressed by the ACP type indication and stored in ACPC of per call memory by step 5004. Step 5006 loads an end-of-call CPM and CNID set to an "unknown" indication onto the stack to mark a final stack entry for this call. Other stack entries will be placed on top of this entry, as will be seen, so that when the final stack entry is unloaded, NCP processing will be terminated.

Steps 5008 through 5012 set up to execute the CP. The CP is examined to determine the type of the first, or root node. The root node type is placed in CPM and the number of the root node is placed in CNID. Processing is then continued at CQP in FIG. 47. CQP uses the node type in CPM to determine the address of the routine to be executed next and transfers control to that address.

Figure 51:
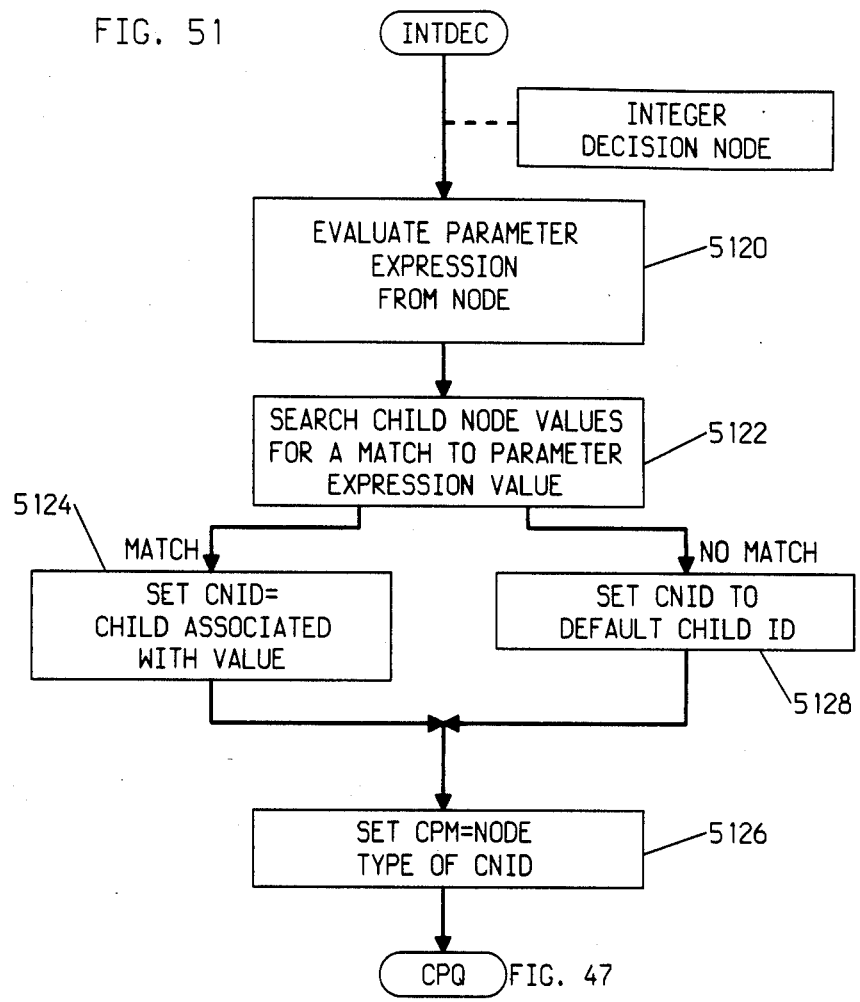

Node 1 of the CP in this example is an integer decision node as shown in FIGS. 32 and 33. CQP therefore transfers to INTDEC in FIG. 51 to execute this node. As shown in FIG. 33, the parameter expression (P-EXP) contains an OST function. The OST function asks for a determination of whether the calling station has rotary, pushbutton or unknown type of signaling. This information is obtained from the QRY(1). If the signaling method is unknown, signaling LNDB 121 is queried using the calling station number contained in the QRY(1) message. The evaluation of OST results in a tone signaling indication 2 in this example, since the calling station is assumed to have pushbutton signaling. Step 5122 searches the child node values of node 1 for a match of the result of the OST function evaluation. In FIG. 33, this is found in outcome 2. Therefore, step 5124 sets CNID equal to node 5 corresponding to the matched outcome value. Had no match been found by step 5122, step 5128 would have set CNID to the default node 2 specified in instruction 1. In either event, step 5126 examines the node type in the CP of the node now in CNID and sets CPM accordingly to cause CQP in FIG. 47 to next execute that node.

Had the calling station above used rotary dial or an unknown type of signaling, nodes 2, 3 and 4 would have been executed as shown by the flowgraph in FIG. 32 and the CP in FIG. 33. Each of these nodes are types that will be discussed at other points of the flowgraph in this illustrative example.

Node 5 is an integer decision node. The parameter expression in FIG. 33 for node 5 specifies an evaluation of the call type. We have assumed that the call type in this example is 0 (1+ noncoin). Reference to FIG. 32 shows that call types 0, 1 and 5 should cause a progression to node 6 and that any other type causes a progression to node 2. Referring to the outcome values in node 5 of FIG. 33, it is seen that call type 1 is associated with outcome 2 which, in turn, is associated with node 6. Accordingly, INTDEC in executing node 5 causes a progression to node 6.

Figure 54:
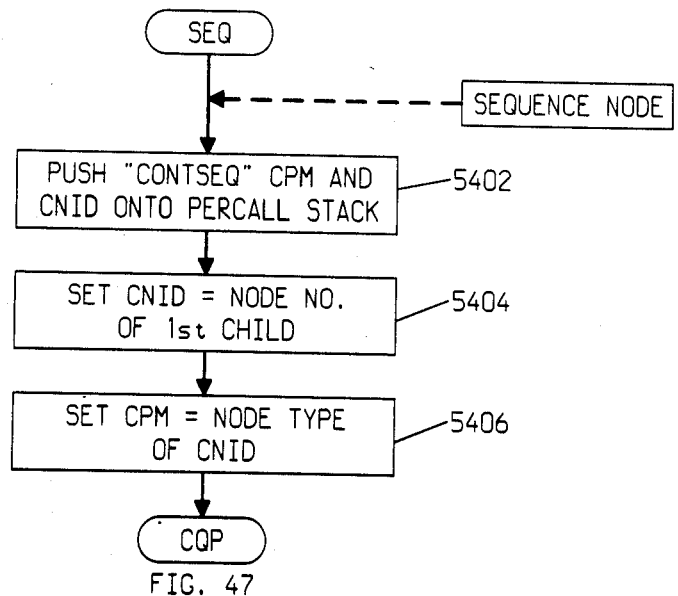

Node 6 is a sequence node executed by routine SEQ in FIG. 54. It is recalled that a sequence node merely executes a sequence of specified nodes. To initiate this process, step 5402 pushes an entry onto the stack with the stack CPM set to the routine CONTSEQ in FIG. 55 and the stack CNID set to node 6 so that eventually control will return to CONTSEQ. Next, steps 5404 and 5406 set the present state of CPM in FIG. 75 to the node type of the first child node contained in the sequence node and CNID in FIG. 75 to the node number of that node. CQP is then entered to execute the first child node.

FIG. 32 shows that the first child node of node 6 is node 7. This node is a set capability node that is executed by routine SETCAP in FIG. 60. As shown by node 7 in FIG. 34, a set capability node contains a number that reflects the capabilities that may be required in the execution of the CP. Step 6002 of SETCAP merely places that number in the required capability register (RCR) of per call memory in FIG. 75 for later use. Step 6004 sets the return status item RSV of per call memory to 0. SETCAP then enters routine UNLDSTK in FIG. 47. UNLDSTK removes the top entry from the stack and transfers control to the routine specified by the CPM stored there. In this case, this routine is CONTSEQ which was specified by node 6 when it set up control to execute its first child node.

Figure 55:
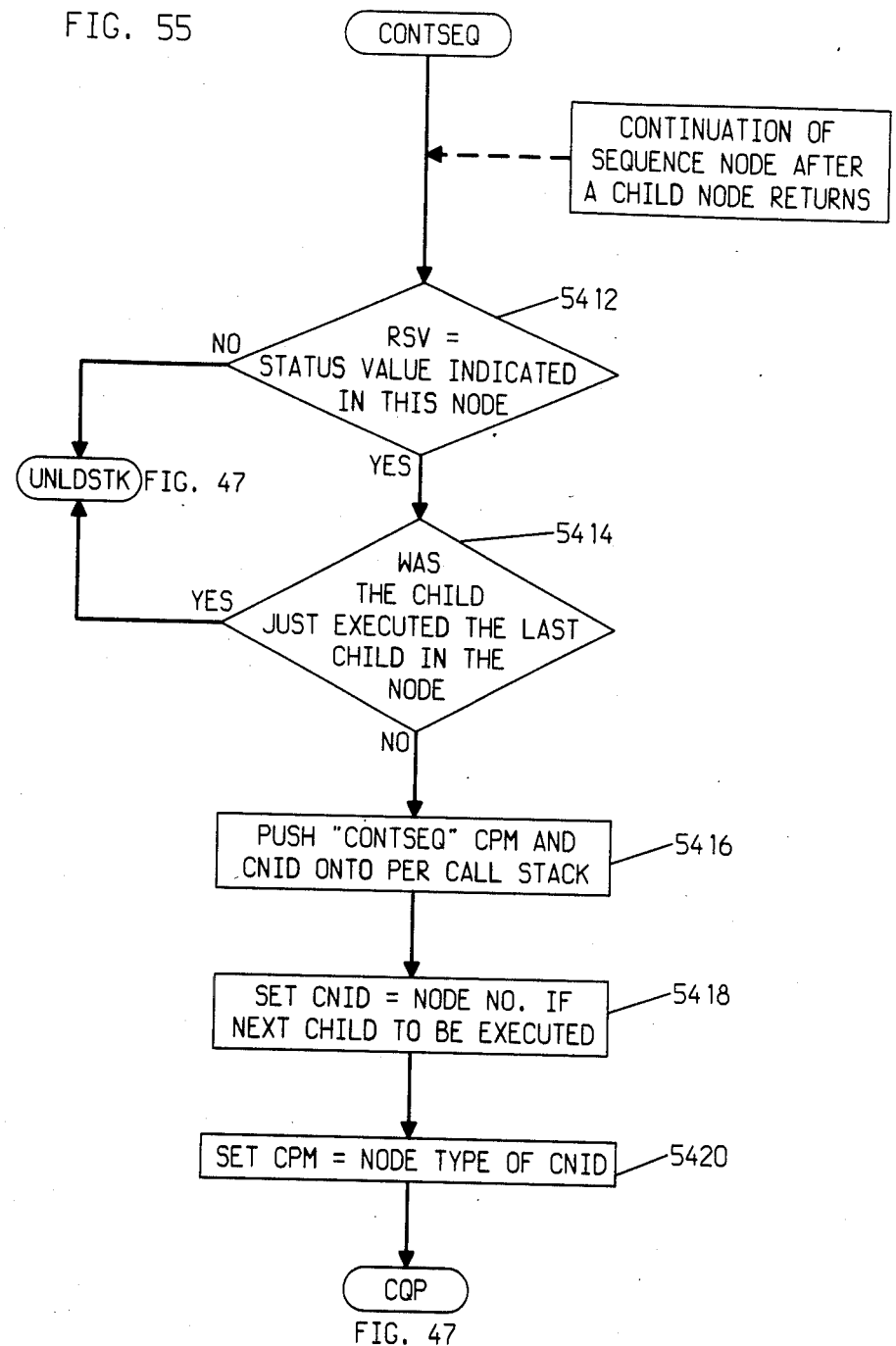
Figure 56:
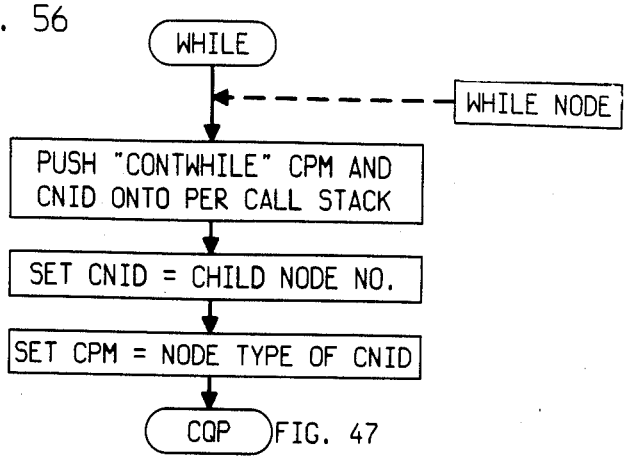
Figure 57:
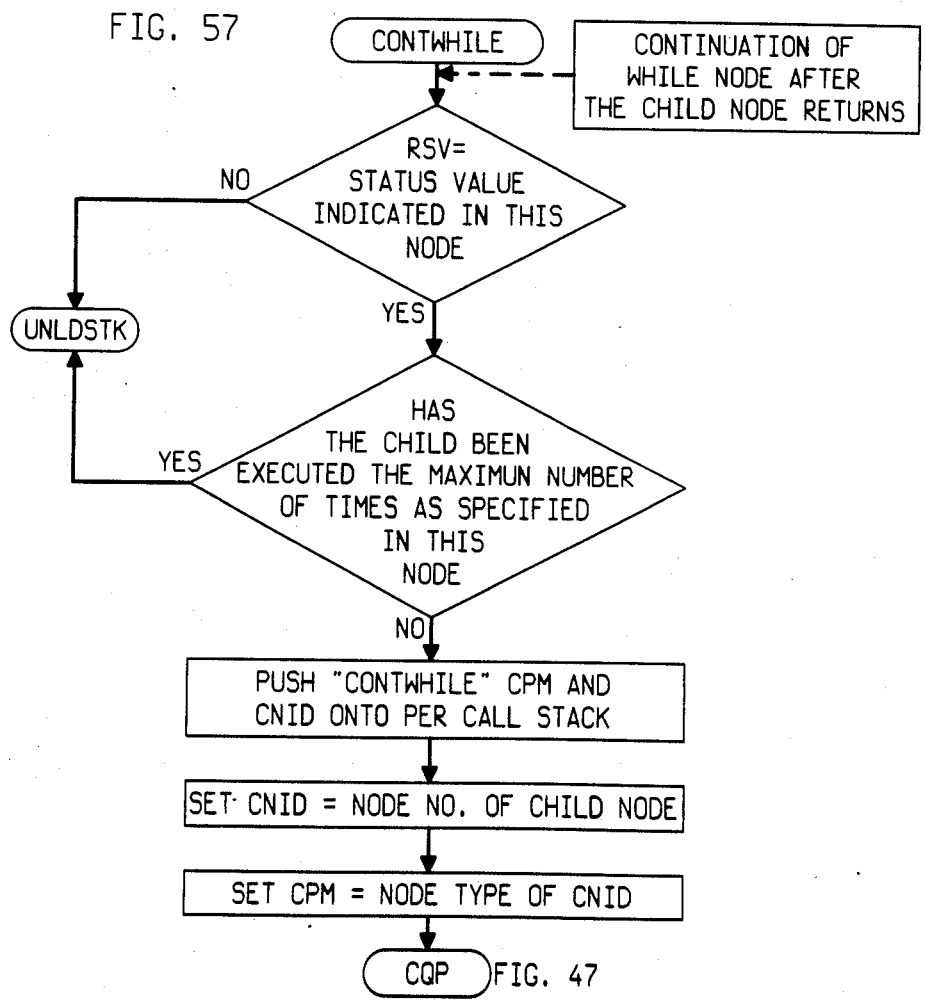
Figure 58:
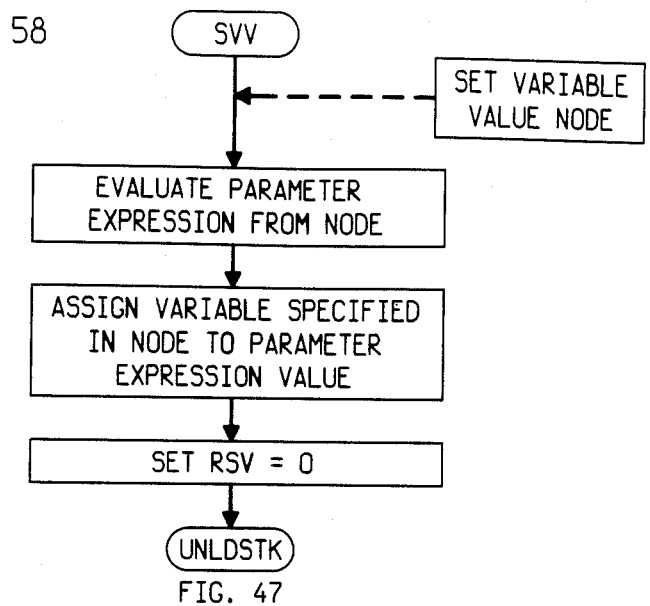

CONTSEQ in FIG. 55 continues the execution of sequence node 6. Every node either generates a status value in RSV of per call memory or returns the status value generated by a child of the node indicating the result of execution. In the case of a sequence node, the status value returned by each child node is used to determine whether or not to continue execution of the sequence. The expected status value is stored as part of the data in a node. The expected status stored in node 6 is 0. Step 5512 of CONTSEQ checks RSV for this value and discontinues execution of node 6 by transferring to UNLDSTK if the expected value is not present.

The expected value 0 was stored in RSV by step 6004. Therefore, execution of the sequence node is continued unless terminated by step 5514 in the event the child node just executed was the last child node in the sequence. Node 8 yet to be executed is the last child node of node 6. Therefore, step 5516 sets up to return to CONTSEQ by pushing an entry onto the stack. Steps 5518 and 5520 then setup to transfer control to node 8 by setting CNID to 8 and CPM to the node type of node 8 and entering CQP.

Node 8 is also a sequence node with an expected status return value of 3. Its purpose in this example is to control the performance of an announcement to the caller and the resulting collection of information digits from the caller. It also provides for a repeat of the announcement and digit collection if the first attempt is unsuccessful. The first child node of node 8 is node 9. Node 9 is also a sequence node with an expected return status value of 0. The first child node of node 9 is node 10 which performs the announcement and digit collection. The second child node 11 of node 9 begins a sequence of nodes to evaluate information dialed by a caller in response to the collect node 10 and to complete the call accordingly.

The data in node 10 of FIG. 34 specifies that one digit is to be collected from the caller. The announcement ID in node 10 is one or more numbers each identifying an utterance to be performed by an NSC. When the announcement numbers are concatenated and performed, a verbal message such as "At the tone plese dial 1 for reservations or 2 for information" is produced. The data in node 10 also specifies that the information digit when returned from the ACP to the NCP is to be placed in a per call register 1 for access by subsequent nodes. "Per call" means that this register is reserved for this call while the NCP is associated with it. This prevents mutilation of the information by the processing of other calls at the NCP after the information is received. The data to be stored in register 1 is also specified as a string variable in node 10.

Figure 64:
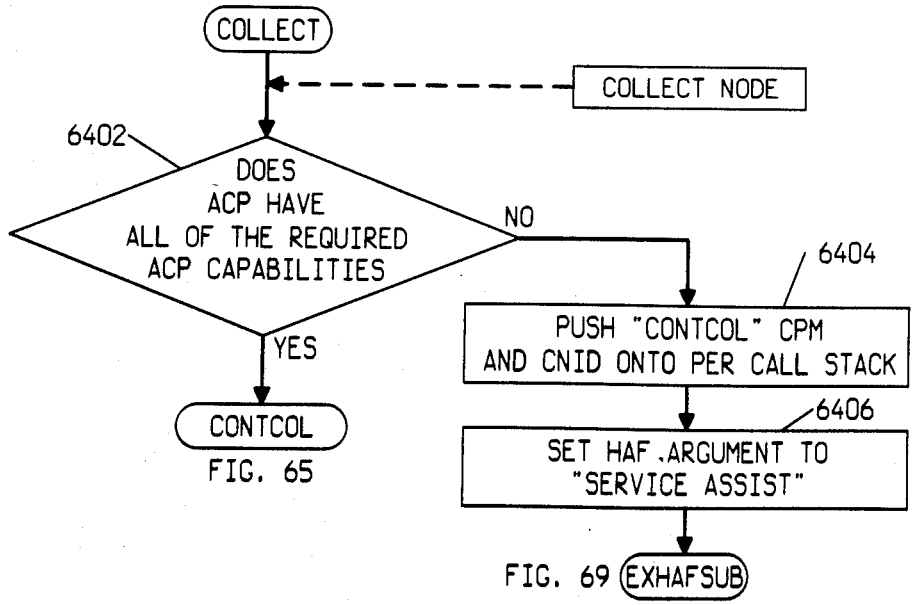
Figure 65:
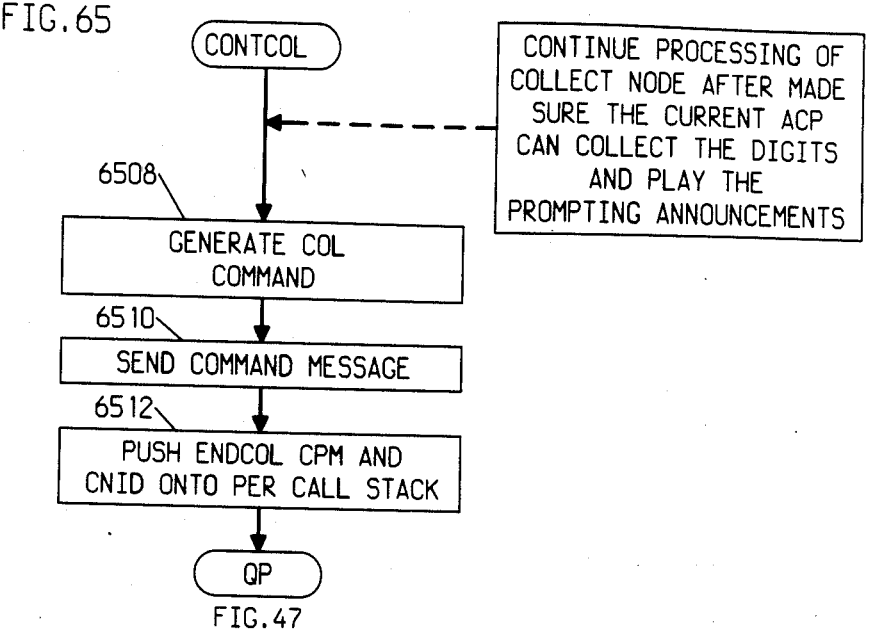

Routine COLLECT in FIG. 64 executes the collect node 10. Step 6402 determines if ACP 110 has all the capabilities that might be required to process this call. This is done by using the ACP type indication from the QRY(1) message to consult a table (not shown) maintained at the NCP containing the capabilities of each ACP. If the answer is no, step 6404 pushes an entry onto the stack to eventually return to CONTCOL in FIG. 65. Step 6406 prepares to enter a routine EXHAFSUB by storing a "service assist" argument for the routine.

Figure 69:
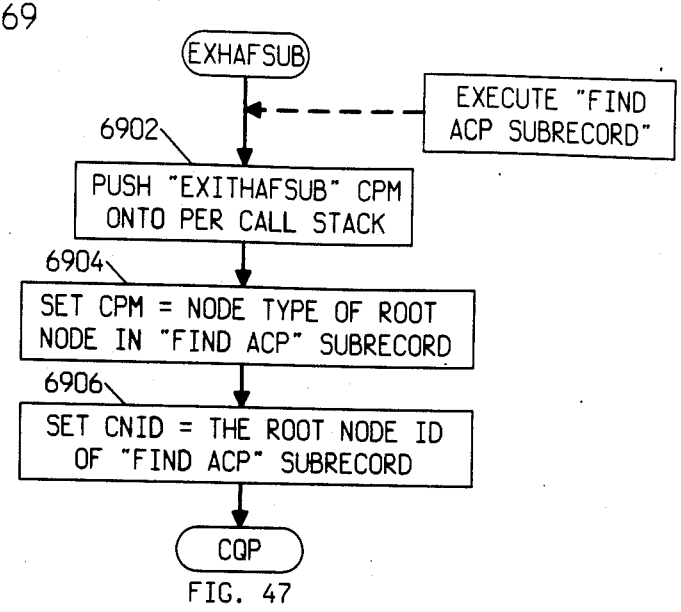
Figure 70:
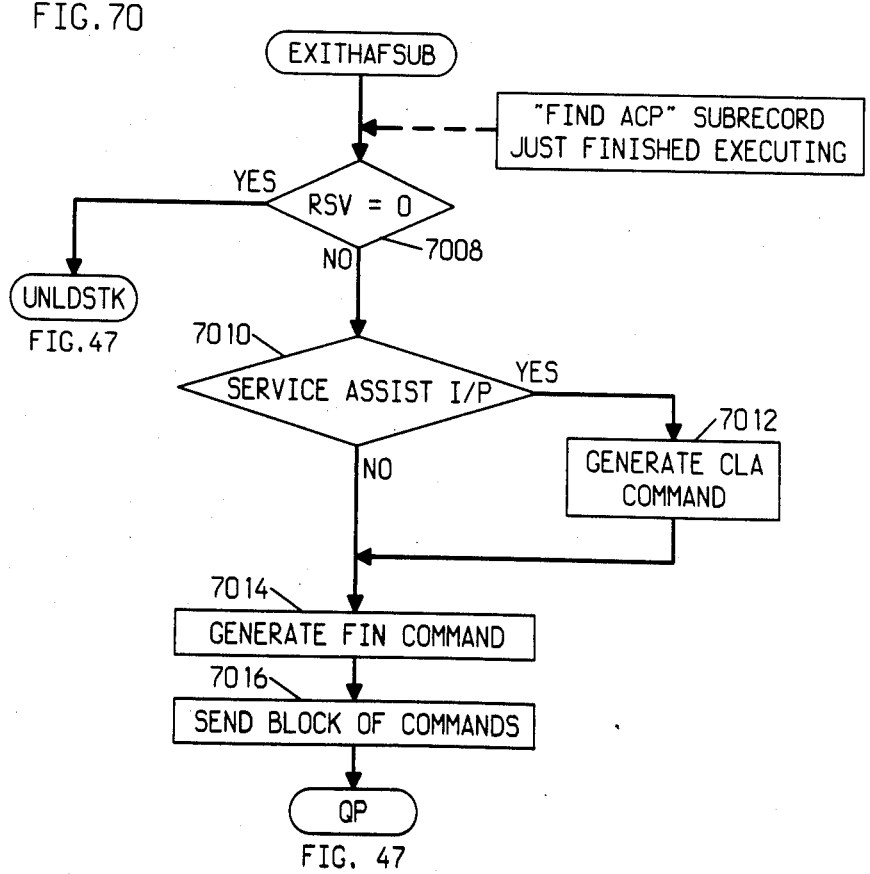
Figure 71:
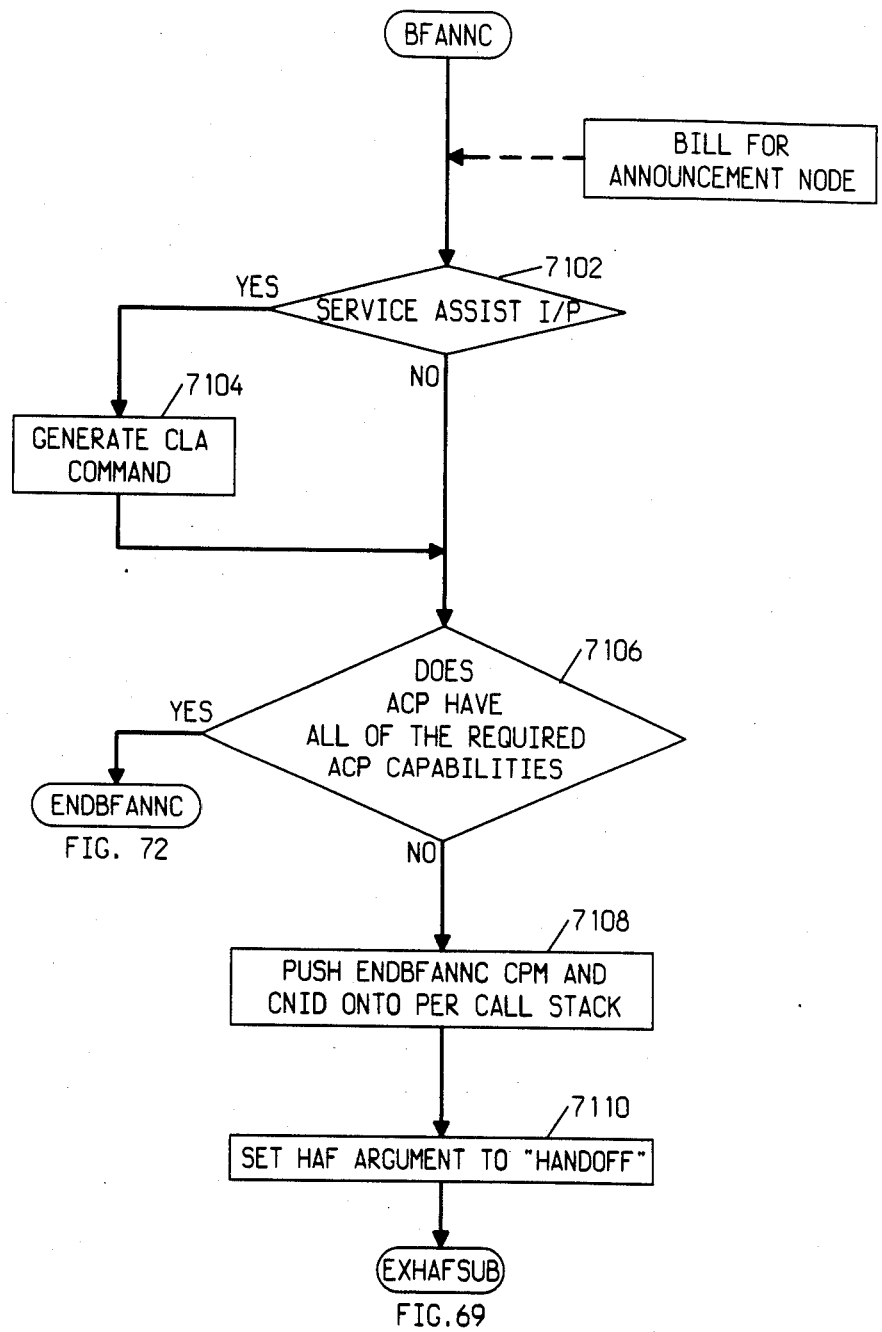
Figure 72:
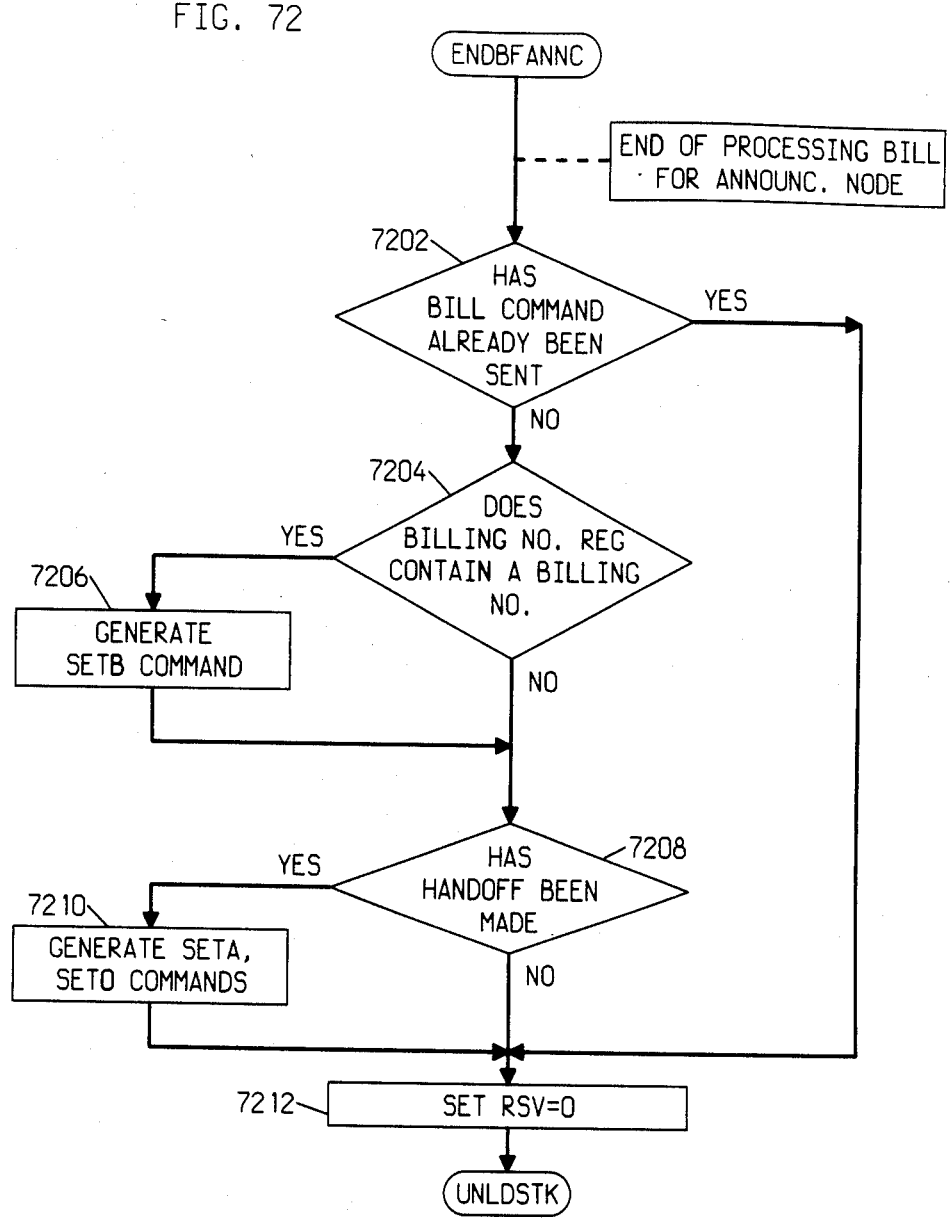

EXHAFSUB, as shown in FIG. 69, executes a subprogram FIND-ACP to identify an ACP for a handoff or service assist. A subprogram is an executable program similar to a CP, but which is available for use during the execution of any CP. Step 6902 of EXHAFSUB pushes an entry onto the stack to eventually enter EXITHAFSUB in FIG. 70. Then steps 6904 and 6906 set the present CPM and CNID to reflect the first node in subprogram FIND_ACP. EXHAFSUB then transfers to CQP to begin execution of the subprogram.

Figure 37:
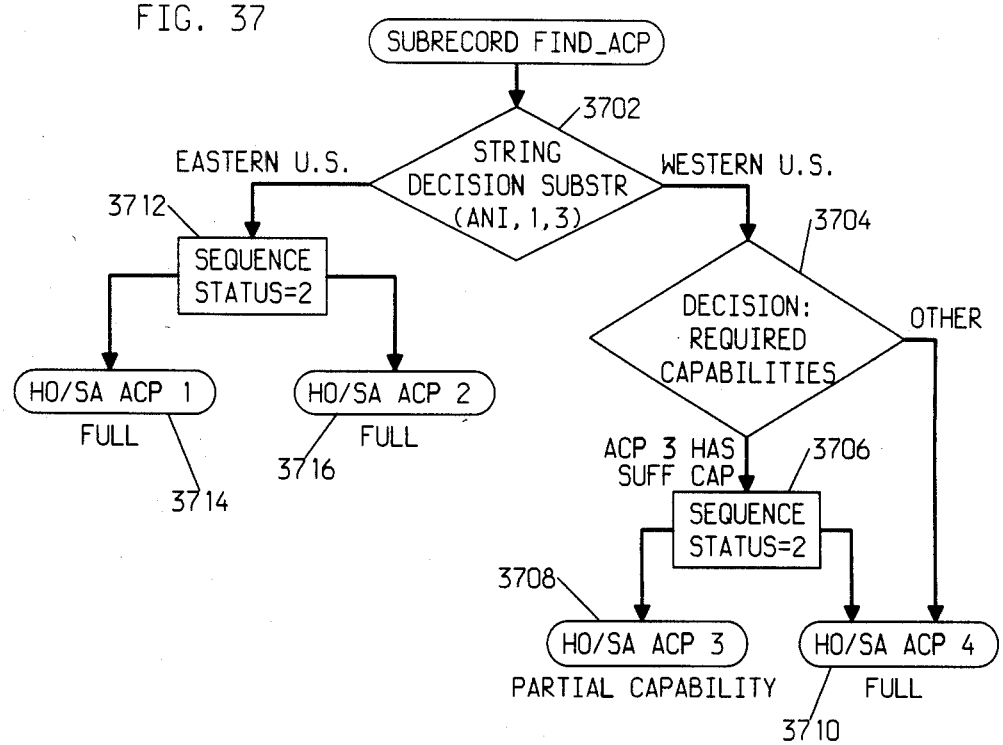
FIG. 37 shows a flowgraph of a subprogram used to select an assisting ACP or a handoff ACP when it is determined that a serving ACP lacks one or more primitive capabilities required to completely process a call according to the requirements of a customer program. A subprogram is similar to a customer program except that it can be executed during and as part of the execution of any customer program.

A flowgraph for one illustrative subprogram FIND-ACP is shown in FIG. 37. It is emphasized that this is only one example of a subprogram which might be used to identify an appropriate assisting or handoff ACP. Numerous such subprograms could be designed depending on the specific design requirements of a system.

Node 3702 of FIND-ACP is a string decision node which tests the first three digits of the calling station number. This is indicated by the notation (ANI,1,3) in node 3702 which means test 3 digits of the calling number beginning with digit 1. The purpose of this test is to select a handoff/assist ACP in the same relative half of the country (east or west) as the calling station to avoid excessive routing costs. In this example, we have assumed that there are four ACPs, ACP1 through ACP4, across the country that are used as handoff/assist ACPs. ACP1 and ACP2 are assumed to be in the western United States and ACP3 and ACP4 are assumed to be in the eastern United States. ACPs 1, 2 and 4 are assumed to be have full capability, whereas ACP3 has a known subset of the full capabilities. If the calling station were in the eastern United States sequence node 3712 would select ACP1 or ACP2 as the handoff/assist ACP. A detailed discussion of how a geographic determination is made, such as "east" or "west", will be given in our discussion of node 19. The manner of selection will become apparent in the remaining discussion.

Figure 53:
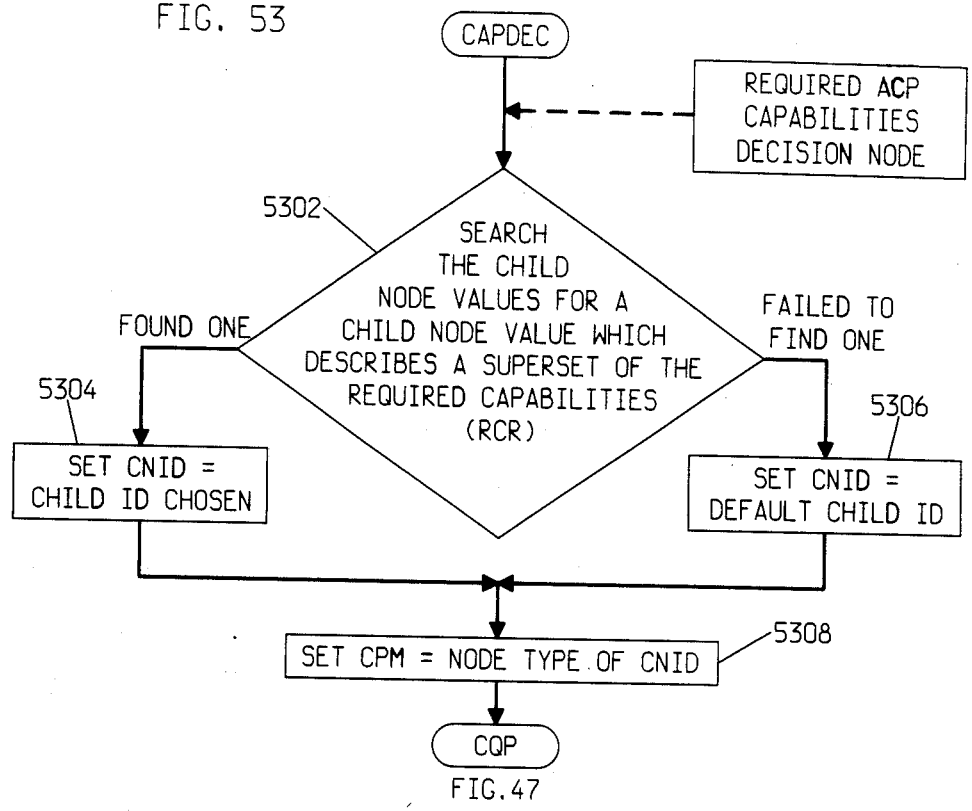

In this example, the calling station is on the west coast. Therefore, node 3702 causes the execution of node 3704. Node 3704 is a required capability decision node that is executed by routine CAPDEC in FIG. 53. The child node outcome values in item 1906 of the node each contain a set of bit indications in the same format as that of the required capabilities register (RCR) in FIG. 75 which describe the capabilities of a potential assist/handoff ACP. Step 5302 of CAPDEC searches these outcome values for an ACP which has all the required capabilities stored in RCR. If the search is successful, the present CNID is set to the child node in item 1905 corresponding to the outcome value in 1906 that satisfied the search. If the search is unsuccessful, step 5306 sets CNID to the default node in item 1904. Step 5308 sets the present CPM to reflect the node type of the selected child node and CQP is entered to continue processing.

Figures 74, 75:
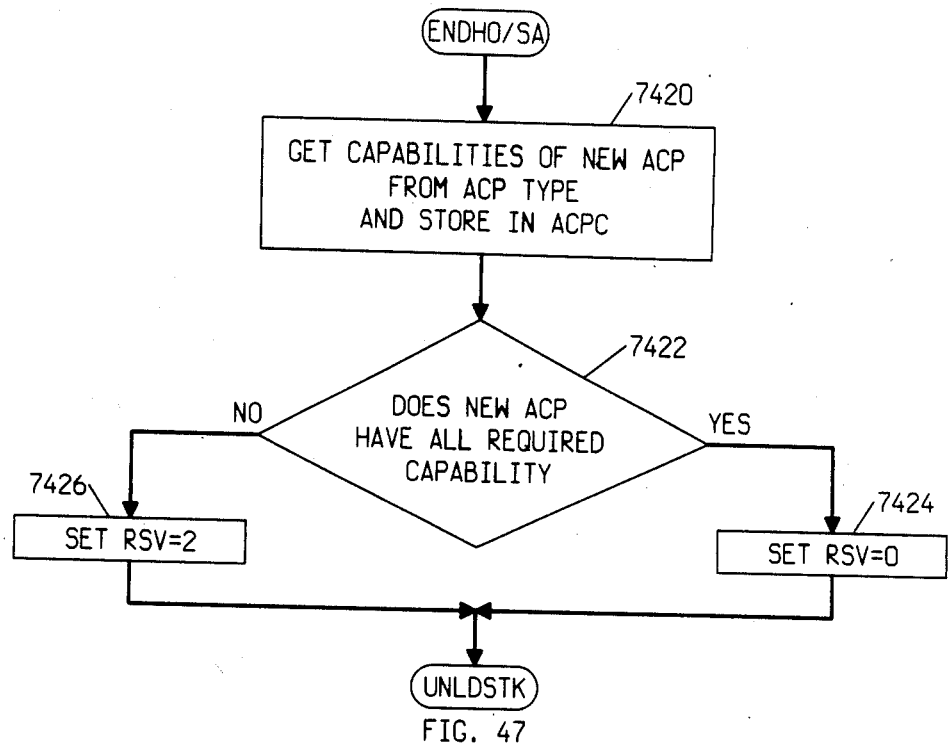

In the present example, CAPDEC compares the required capabilities for this call as stored in RCR of per call memory in FIG. 75 to the subset of capabilities present in ACP 3 stored as part of the data of node 3704.

Figure 73:
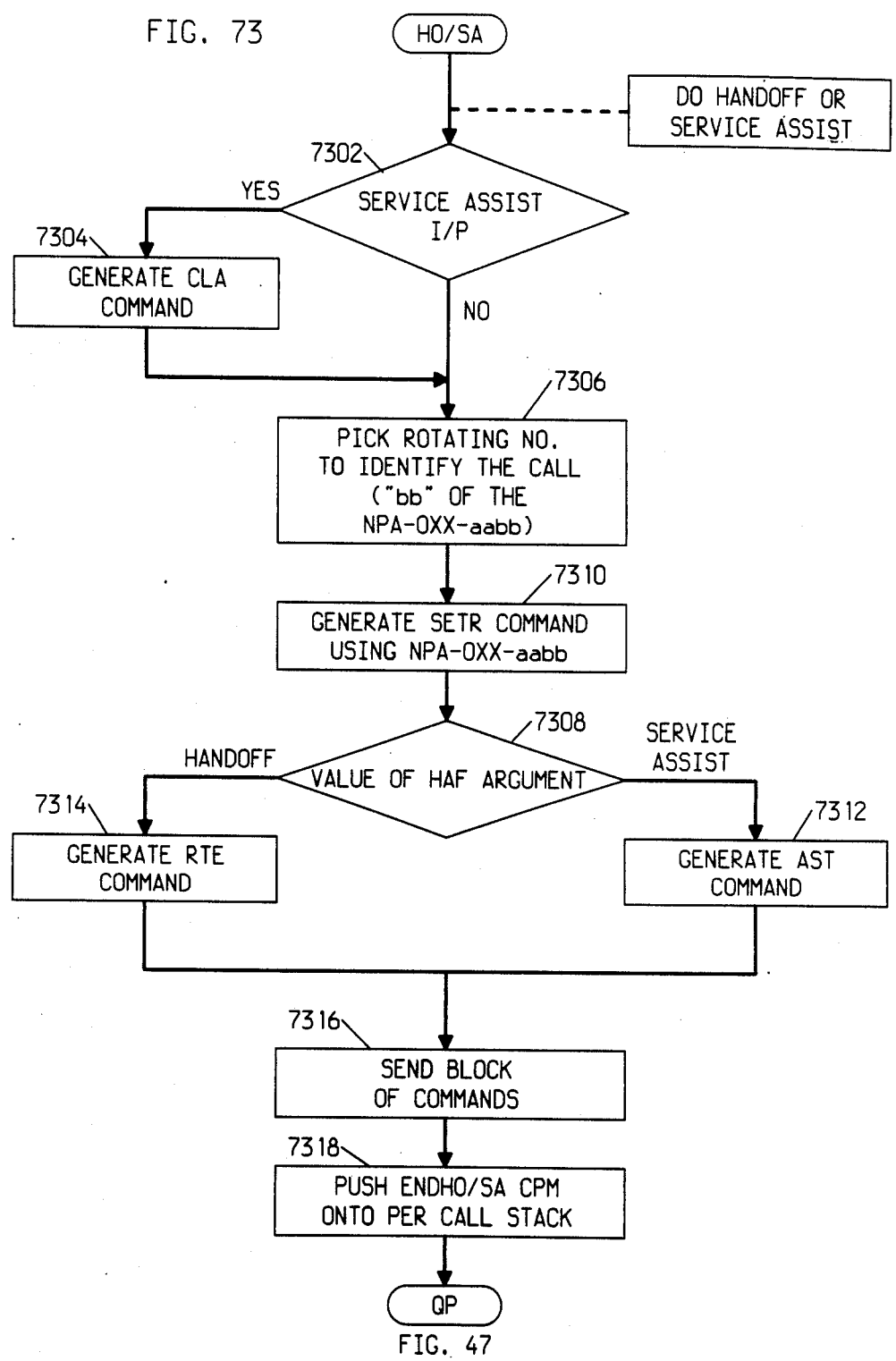

Let's assume that ACP3 is ACP 111 in FIG. 1 and that it ordinarily has sufficient capability for this call. Sequence node 3706 is therefore executed. Sequence node 3706 first execute handoff/assist (HA/SA) node 3708. This node is executed by the HO/SA routine in FIG. 73. Node 7302 determines if an assist is already in progress on this call. This is possible as will seen below. At the present time no assist is in progress. Step 7306 generates a number for routing this call to ACP 111 by selecting the next available pair of digits "BB" from an assignment pool as discussed earlier and forming the destination number NPA-OXX-AABB. It is recalled that the digits "BB" identify this call and that "NPA-OXX" identifies ACP111. Step 7308 generates an SETR command with the destination number just generated. Step 7310 determines from the HAF argument if this is a handoff or assist request. Since an assist is requested, step 7312 generates an AST command. Otherwise, step 7314 generates an RTE command. The SETR and AST commands are transmitted to ACP 110 by step 7316. This is symbolically illustrated by the encircled 2 on the CCIS link 130 in FIG. 1. Step 7318 then pushes an entry onto the per call stack to enter ENDHO/SA in FIG. 74 when a response to the above commands is received from ACP 110. Control is now given to QP in FIG. 47 to suspend NCP operations on this call.

Figure 39:
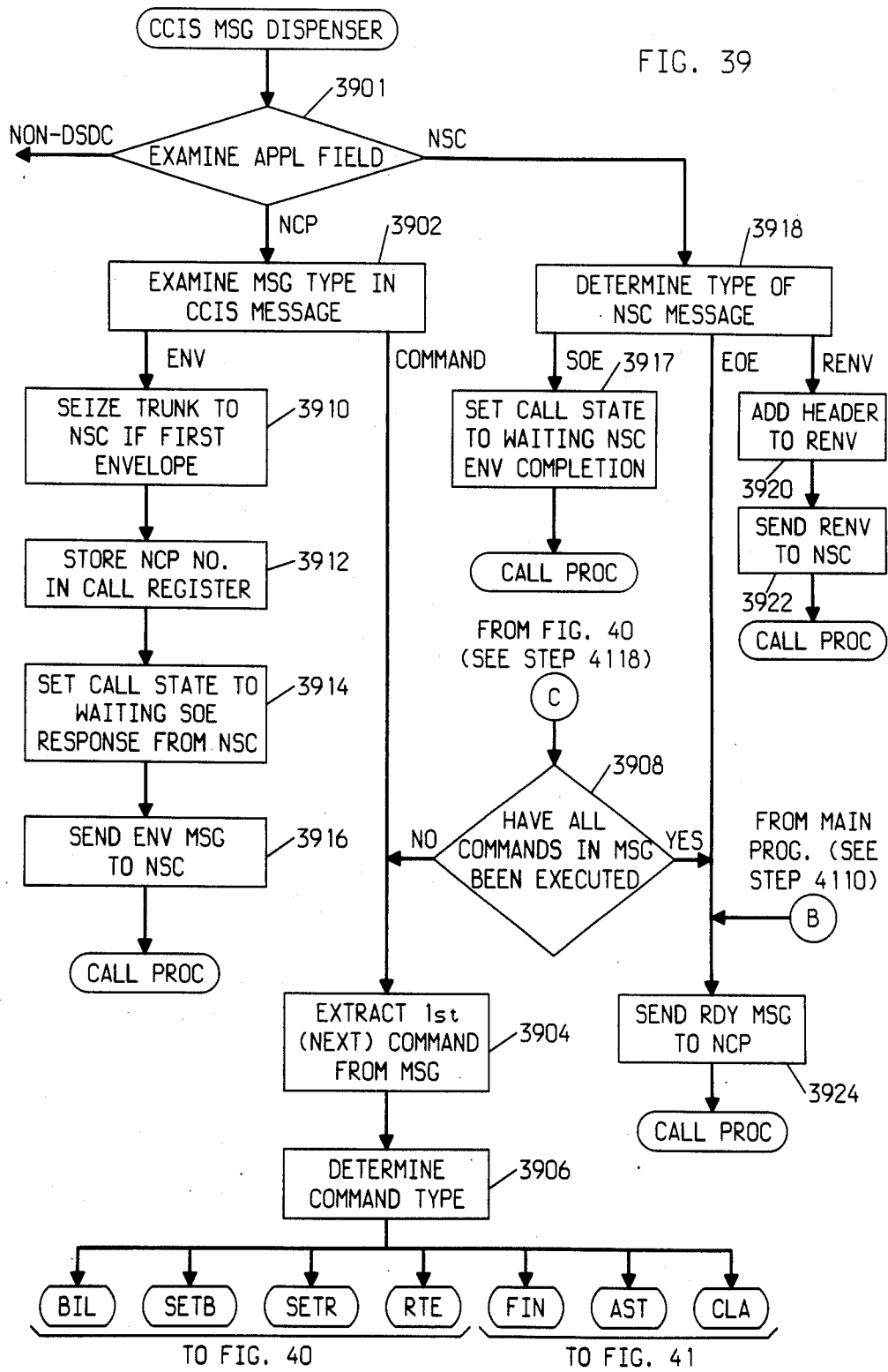

The RTE and AST commands are received by the message dispenser in ACP 110. This routine is shown in FIG. 39. Steps 3902, 3904 and 3906 decode the SETR command and transfer control to routine SETR in FIG. 40. Steps 4012 and 4014 load the ACP call register for this call with the destination number NPA-OXX-AABB from the SETR command. Step 4016 loads the billing block with the destination number. Next, steps 3908, 3904 and 3906 decode the AST command and transfer control to the AST routine in FIG. 39.

Figure 41:
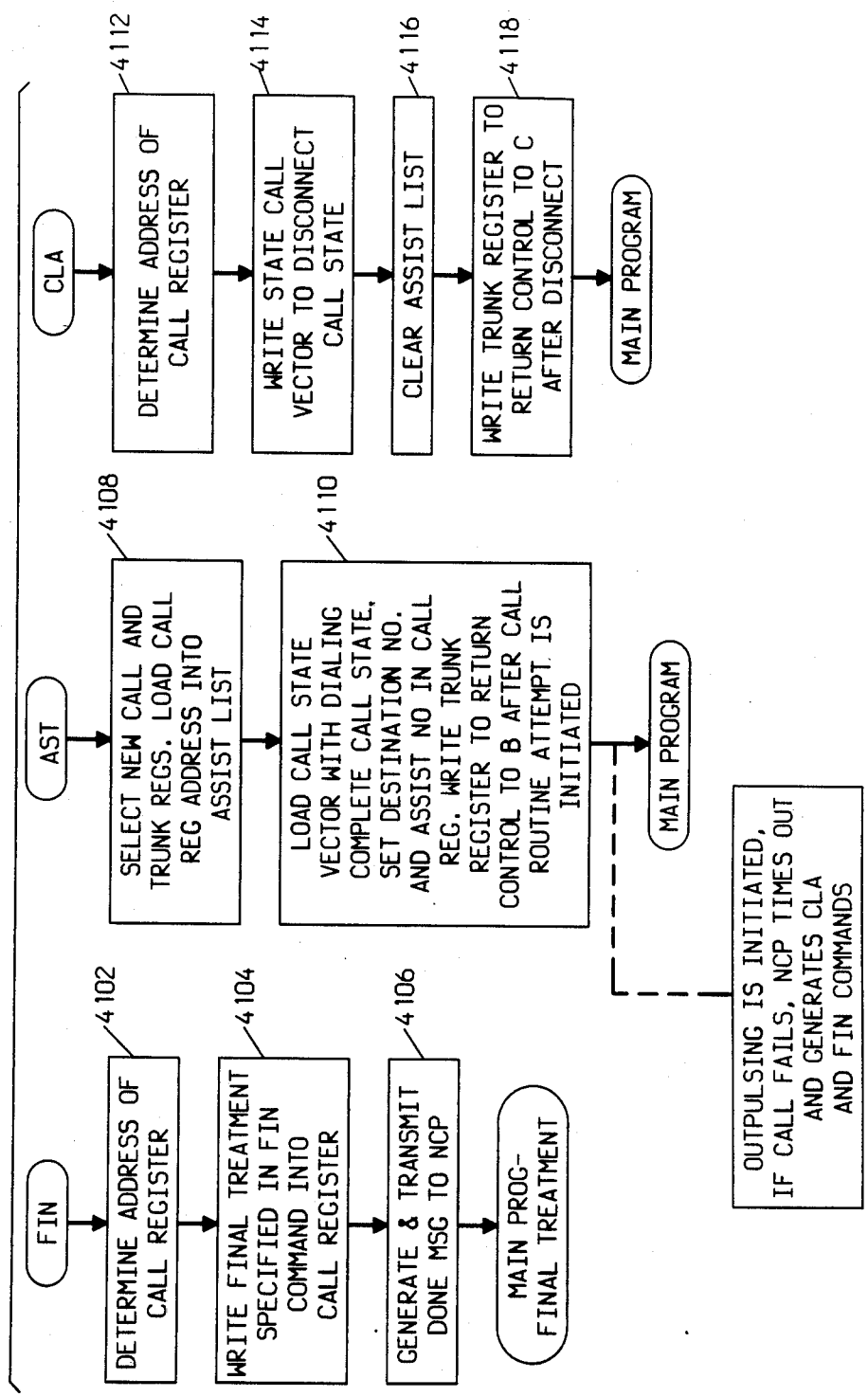

Step 4108 selects a trunk to route this call to the assist ACP 111 and loads the call register address into the assist list shown in FIG. 42 using the BB digits of the assist number as an index. Step 4110 loads a call state vector in the call register with a "dialing complete" call state. The assist number is also written into the call register. Finally, the trunk register is updated to return control to software address B in FIG. 39 after a call routing attempt is complete. Control is then given up temporarily. Conventional software in the ACP now attempts to forward the call from this ACP to assist ACP 111 in accordance with information in the call and trunk registers. This is encircled step 3 on trunk 112 in FIG. 1. Assuming that a call is successfully routed, control eventually returns to address B in FIG. 41 where an RDY message is returned from assisting ACP 111 to NCP 120 by step 3924. This message is represented by the encircled 4 on link 130 in FIG. 1.

If call forwarding to the assist ACP fails, a software timing function (not shown) at NCP 120 will eventually timeout and cause the generation of CLA and FIN commands to clear the call out of the system.

ACP 111 recognizes the incoming call as an assist call from the received destination number as discussed. In response, it formulates and transmits a QRY(2) message to NCP 120 via CCIS link 130. This is encircled step 5 on link 131 in FIG. 1.

The QRY(2) message is placed in the response queue of NCP 120 upon arrival. Steps 4702 and 4720 of FIG. 47 remove the QRY(2) message from the response queue on a subsequent entry to routine QP. Step 4722 tests to see if the last command sent to an ACP on this call was a FIN command. Since this is not the case in this example, step 4712 next removes the top entry from the per call stack to determine what to do next. The top entry contains an ENDHO/SA CPM put there by step 7318. Therefore, step 4718 causes a transfer to routine ENDHO/SA in FIG. 74. Step 7420 translates the ACP type received from the assist ACP 111 in the QRY(2) message into a set of capabilities. A representation of these capabilities is then stored in ACPC of the per call memory of FIG. 75. Next, step 7422 determines from the required capabilities stored in RCR of per call memory if the assist ACP 111 has all the required capabilities. If so, step 7424 sets the return status value RSV to 0. Otherwise, step 7426 sets RSV to the failure value 2.

Figure 47:
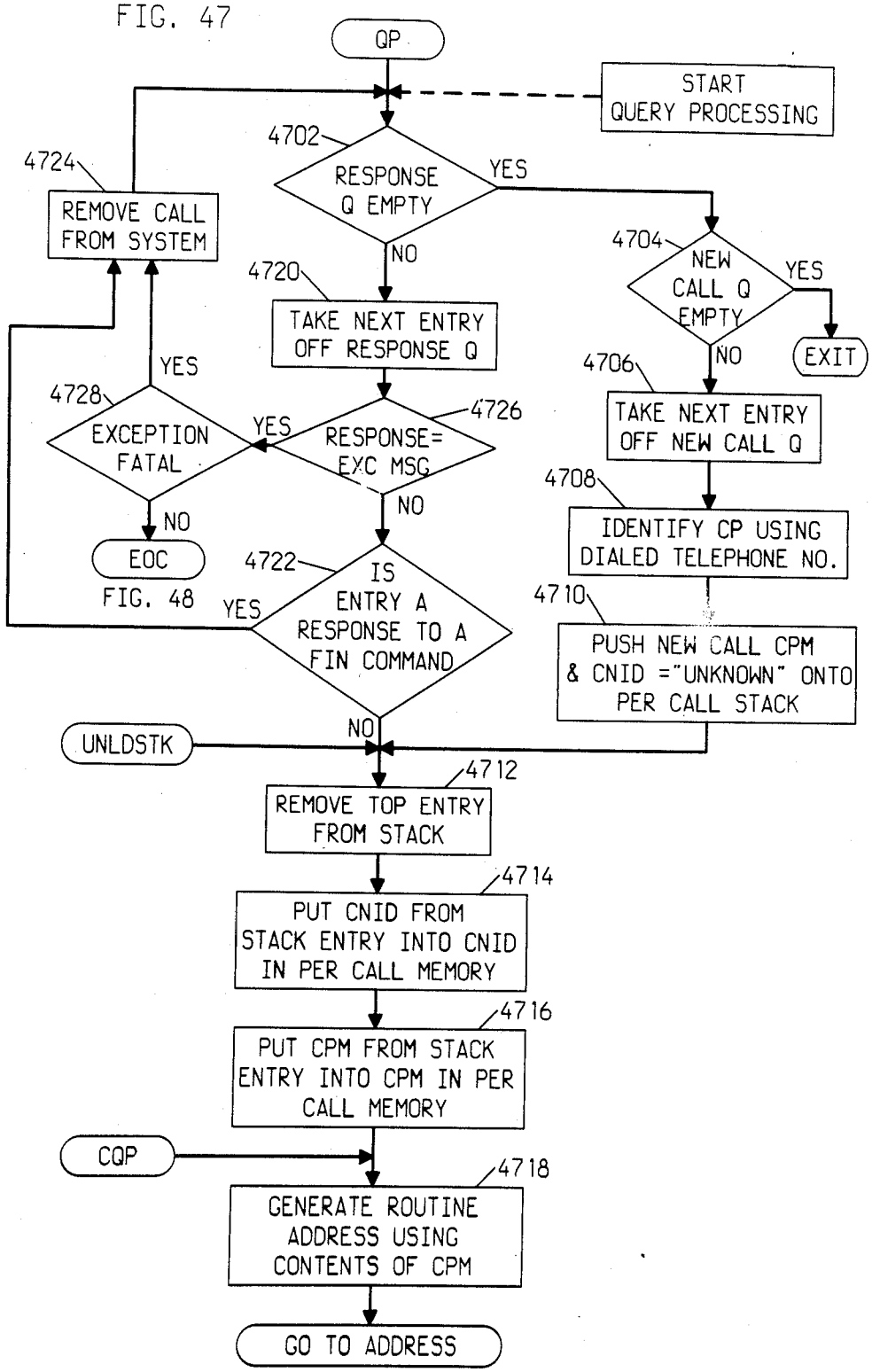
Figure 49:
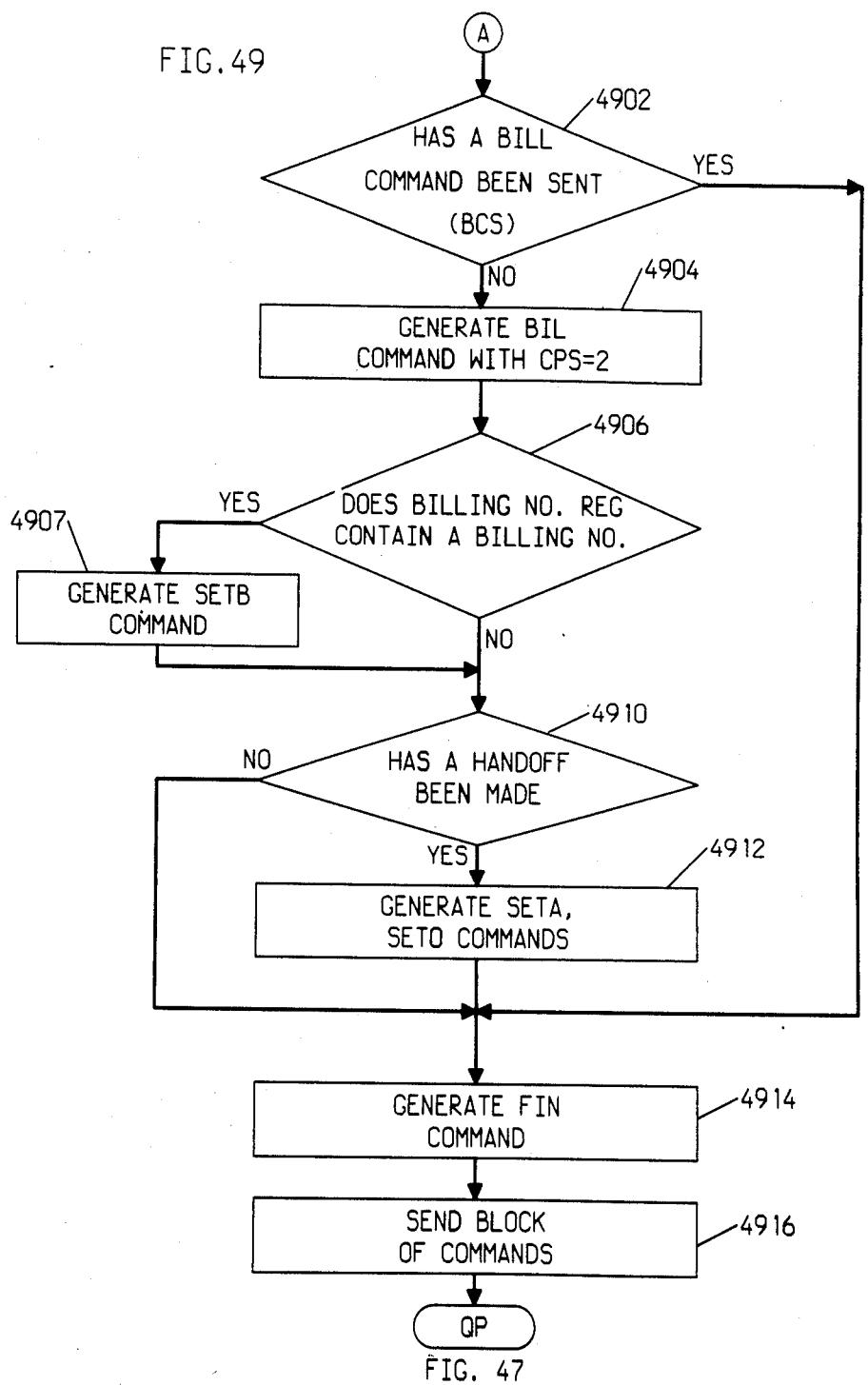

ENDHO/SA now transfers to UNLDSTK in FIG. 47 to process the next stack entry. This is a CONTSEQ entry placed in the stack by the execution of sequence node 3706 in the FIND-ACP subprogram. Processing of this entry by CONTSEQ in FIG. 55 results in a return to UNLDSTK to process the next stack entry. This entry is an EXITHAFSUB CPM put onto the stack by step 6902. Step 7008 of EXITHAFSUB tests RSV and returns to UNLDSTK if the return value 0 is present. This means that the assist ACP 111 is capable of processing remaining commands issued by NCP 120 on this call. On the other hand, if an RSV other than 0 is present, efforts to find an assisting ACP have failed and step 7010 determines if a service assist is in progress. If so, step 7012 generates a CLA command. In either event, step 7014 generates a FIN command. These commands are transmitted to the control ACP 110 to terminate the call. In this event, the CLA command causes ACP 110 to release the call connection to assist ACP 111. The FIN command specifies an appropriate final treatment such as give recorder tone to the caller.

If we assume that the RSV is 0, UNLDSTK reads the stack entry to continue processing of the call. The next stack entry is a CONTCOL CPM stored by step 6404 in the COLLECT routine. CONTCOL is in FIG. 65. Steps 6508 and 6510 generate and transmit a COL command to the assist ACP 111. Because the digit collect function is performed by an NSC (specifically NSC 150 in this case), the COL command is transmitted as an envelope message. This is encircled step 6 on link 131 in FIG. 1. Step 6512 pushes an ENDCOL CPM entry onto the stack and enters QP in FIG. 47 to wait for execution of the envelope.

With reference to the ACP flow diagrams in FIG. 39, step 3902 recognizes the envelope command and transfers control to ENV in FIG. 39. Since this is the first envelope command on this call, step 3910 seizes a trunk to NSC 150 in a conventional manner. Steps 3912, 3914 and 3916 perform bookkeeping operations such as storing the NCP 120 number in the ACP call register for this call and setting the call state in the call register to "waiting for a start of envelope (SOE) response" from the NSC. Step 3916 transmits the envelope message to NSC 150 and ACP call processing is then temporarily suspended to await NSC action on the envelope. The envelope transmittal to NSC 150 is encircled step 7 on link 152 in FIG. 1.

Figure 43:
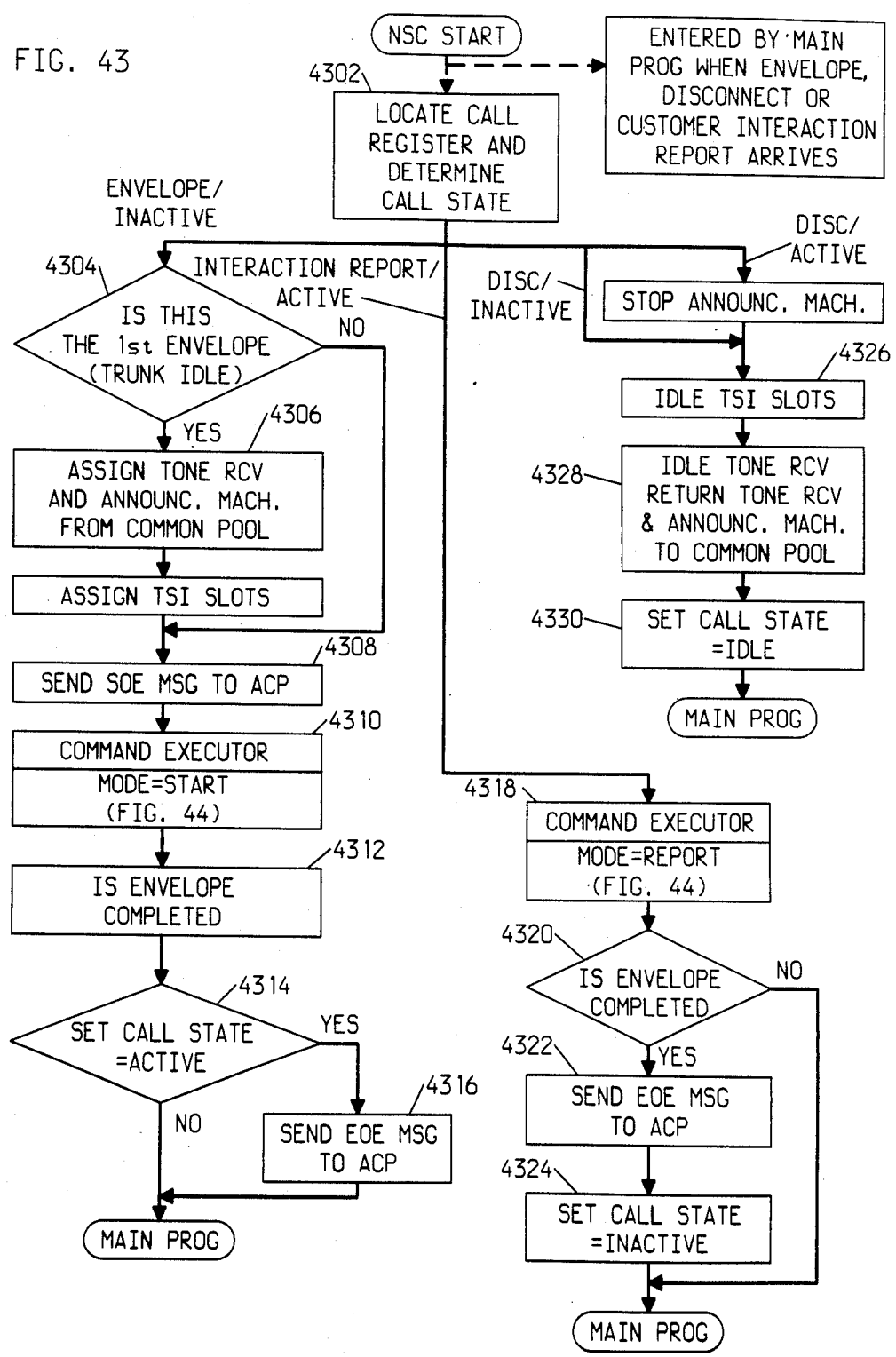
FIGS. 43 through 46 show illustrative flowcharts of the program at an NSC.
Figure 44:
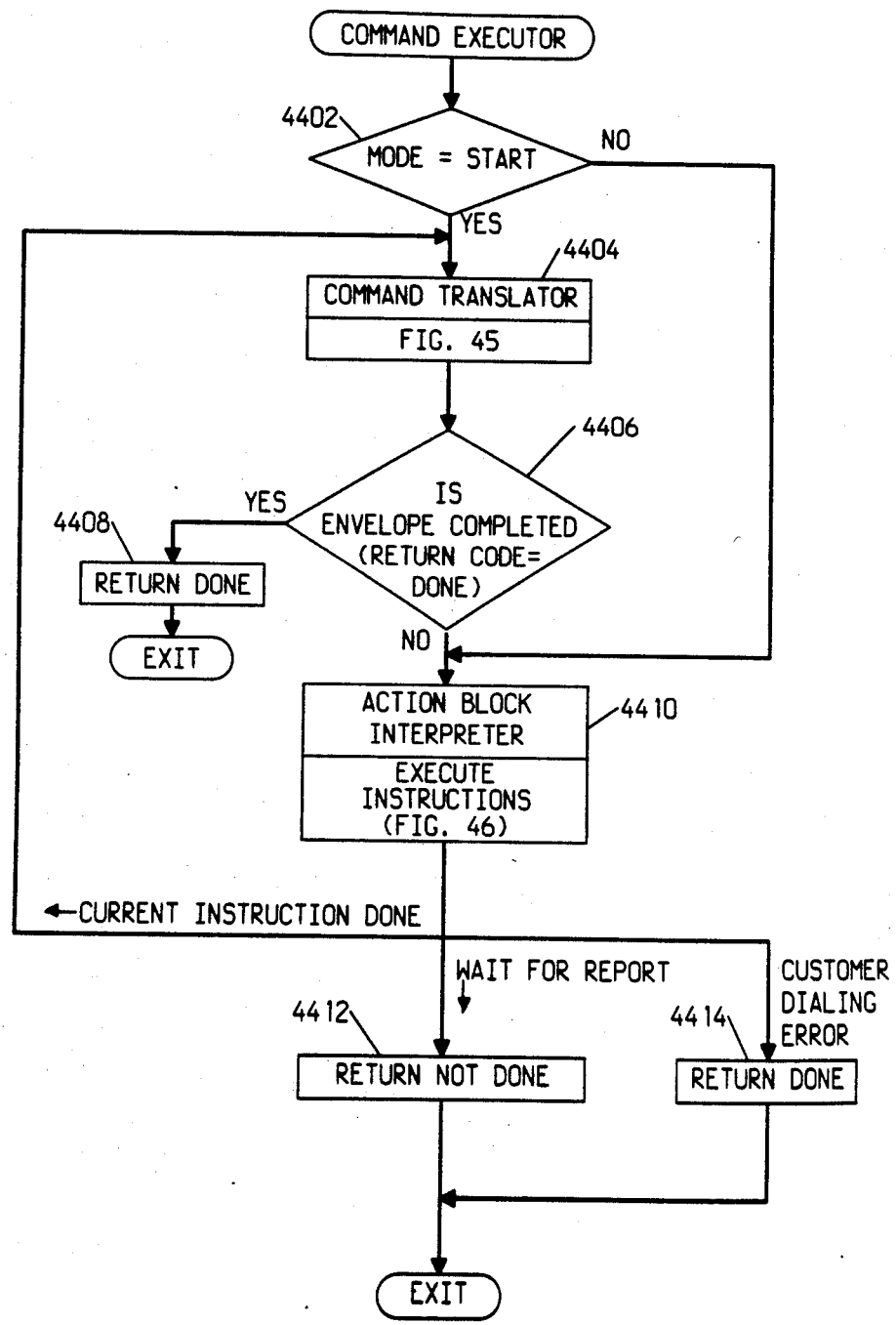
Figure 45:
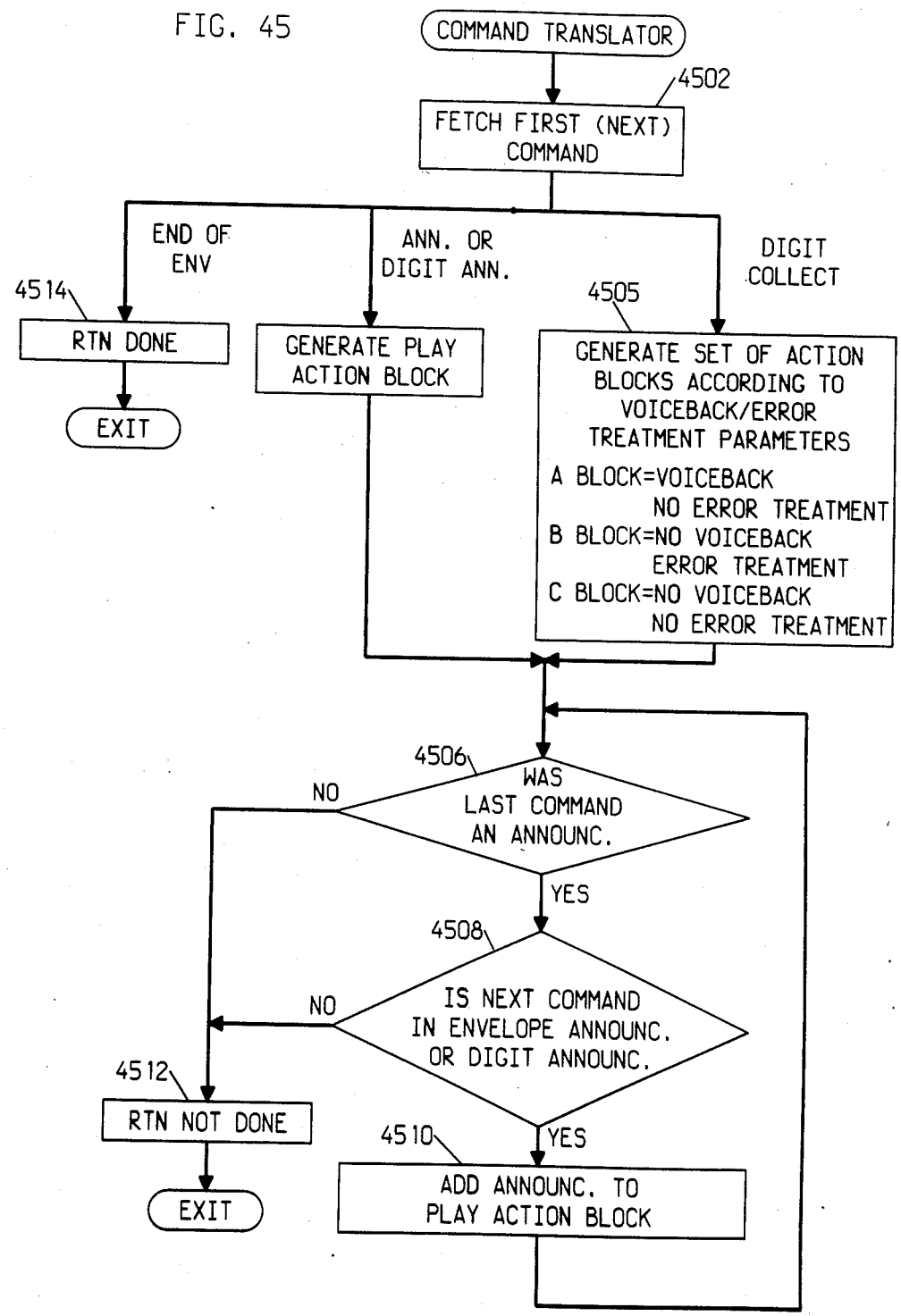

Receipt of the envelope command at NSC 150 causes the execution of routine NSCSTART in FIG. 43. Before calling NSCSTART, a preprocessing program (not shown) seizes and initializes a call register at the NSC in a conventional manner. Step 4304 reads the call register to determine the call state. Initially the call state reflects an inactive state and the arrival of the envelope message. Step 4304 determines that this is the first envelope message to arrive on this call. It assigns switching time slots in a conventional manner for communication between the incoming trunk and a tone receiver and announcement machine at the NSC. Step 4308 sends an SOE message to ACP 111. This is encircled step 8 on line 152 in FIG. 1. Step 3917 of routine SOE in the ACP flowcharts of FIG. 39 sets an appropriate call state into the call register in response to the SOE message. At step 4310 subroutine COMMAND EXECUTOR in FIG. 44 is called. A mode parameter set to START is passed by the subroutine call. Step 4402 tests the mode parameter and, as a result, step 4404 calls another subroutine COMMAND TRANSLATOR (FIG. 45). Step 4502 of COMMAND TRANSLATOR interprets the first command of the envelope message as a COL and transfers to step 4504 to generate action blocks for execution of the COL command. An action block is a template of instructions for execution into which parameters are inserted by step 4504 before execution in response to a command for an NCP. One of three action blocks A, B and C may be generated by step 4504 according to the parameters of the COL command from NCP 120. An A block requests voiceback. It may be recalled that voiceback means a playback of any information digits dialed by the caller. A block and B block specifies no voiceback with some type of error treatment in case the caller incorrectly dials information digits. A block and C block specifies no voiceback and no error treatment.

The templates for the action blocks A, B and C are as follows:

Action Block A
1. PLAY_COLLECT; go to instruction 5 on success, instruction 2 on failure
2. SEND_DIGITS
3. SEND_EXC
4. EXIT
5. SAVE_DIGITS
6. PLAY_COLLECT; go to instruction 9 for "*" digit, instruction 7 for any other digit
7. SEND_SAVED
8. EXIT
9. PLAY_COLLECT
10. SEND_DIGITS Action Block B
1. PLAY_COLLECT; go to instruction 5 on success, instruction 2 on failure
2. SEND_DIGITS
3. SEND_EXC
4. EXIT
5. SEND_DIGITS Action Block C
1. PLAY_COLLECT; go to instruction 5 on success, instruction 2 on failure
2. SEND_DIGITS Each of the above-numbered statements in the action blocks is an instruction which is interpreted and executed at the appropriate time by the NSC. The discussion below will provide a clear understanding of the action blocks.

Reference to collect node 10 of the CP in FIG. 34 shows that a collect meassage with voiceback and no error treatment is requested in this example. Therefore, an action block A is generated by step 4504. Step 4506 determines if the last command executed by the NSC was an announcement. If so, steps 4508 and 4150 add announcement numbers to the action block for any following and consecutive announcement or collect commands. This allows virtually any number of announcement numbers to be specified in consecutive NCP commands and to be performed by the NSC as one announcement. In the present case, the COL command was the first command encountered by the NSC. Therefore step 4512 is executed which sets a return parameter to "not done" and returns to the calling routine at step 4406.

Step 4406 determines from the return parameter that command execution is not complete and calls an action block interpreter subroutine at step 4410.

Figure 46:
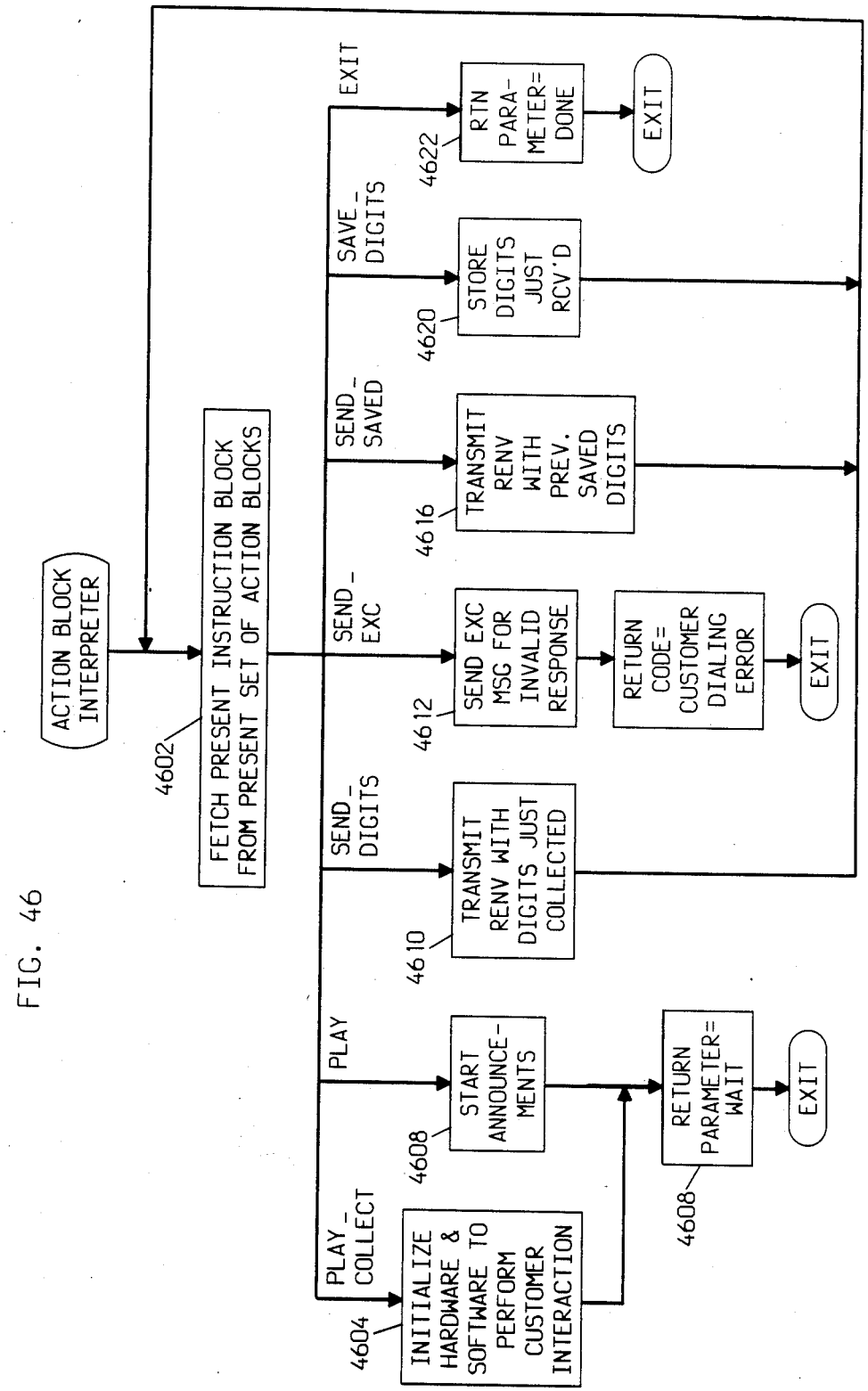

The interpreter is shown in FIG. 46. It is recalled that an action block A is being executed. Step 4602 of the interpreter merely fetches instructions sequentially from the action block as they are executed. The first instruction of action block A is PLAY_COLLECT. In step 4604, this instruction causes the interpreter to initialize the NSC to play the prompt message and collect the number of digits specified in the COL command. Step 4606 sets a return parameter to "wait" and exits to the calling routine to await the completion of digit collection. As a result of this return parameter, step 4412 returns a "not done" return parameter to its calling routine which takes execution to step 4312 in FIG. 43. Since the envelope is not completed, step 4314 sets the call register call state to "active" and exits to the main program.

When digit collection is complete, an interaction report is generated by the software (not shown) which controls the prompting and digit collection hardware. This causes an entry to NSCSTART in FIG. 43 and execution of COMMAND EXECUTOR at step 4318. The mode parameter is not set to "start" at this time. Therefore, step 4402 in COMMAND EXECUTOR transfers control to step 4410 which calls the action block interpreter. Step 4602 now reads instruction 1 again and, at this point in the execution of the action block, determines the result of the prompt and digit collection. If the NSC hardware successfully played the prompt and collected one digit as requested, step 4602 goes to instruction 5 of the action block as specified in instruction 1. Otherwise, control is passed to SEND_DIGITS instruction 2. In response to instruction 2, step 4610 would send whatever digits, if any, were collected to ACP 111 in a RENV message. Next, instruction 3 would send an exception report (EXC) to the ACP to mark a failure.

If we assume that the prompt and digit collection are successful, instruction 5 is executed. Instruction 5 is a SAVE_DIGITS instruction. Step 4620 of the interpreter stores the collected digit in response to this instruction and the next instruction 6 is executed. Instruction 6 is a PLAY_COLLECT. Stored within this particular PLAY_COLLECT instruction is a preset announcement number which is used to perform a voiceback to the caller. The voiceback announcement might illustratively be "You have dialed the digit 2. If this is what you intended, at the tone depress the number key. Otherwise, depress the asterisk key and then input the correct digit or digits again."

This PLAY_COLLECT operates as the one discussed above. Step 4604 initializes the NSC hardware to perform the voiceback and to collect one digit. If the caller inputs an * signal in response to the voiceback, control will be given to instruction 9; otherwise, control is given to instruction 7. The original PLAY_COLLECT is repeated at instruction 9 and whatever information digit(s) are collected in response are transmitted by step 4610 in response to instruction 10.

For this discussion, we assume that the caller sends information digit 2 in response to the prompt and depresses the # key after receiving the voiceback. This causes the PLAY_COLLECT instruction 6 to transfer to instruction 7. Instruction 7 is SEND_SAVED. In response to this type of instruction, step 4616 builds a return envelope (RENV) message with the caller inputted information digit 2 stored by the SAVE_DIGITS instruction 5 and transmits the RENV to ACP 111. This is encircled step 9 in FIG. 1. The next instruction in action block A is then executed. This is EXIT instruction 8. In response to this instruction, step 4622 returns a "done" parameter to its calling routine at step 4410 in FIG. 44. As a result, the COMMAND TRANSLATOR subroutine is called at step 4404. The COMMAND TRANSLATOR finds that all commands in the ENV have been executed. Step 4514 therefore returns a "done" parameter to its calling routine at step 4404. Step 4406 determines that the ENV is complete and returns a "done" parameter at step 4408 to its calling routine. The next step executed is 4320 which advances to step 4322 where an "end of envelope" (EOE) signal is generated and transmitted to ACP 111. This is encircled step 10 in FIG. 1. Step 4324 sets the call register to an inactive state and exits. Eventually, step 4302 will find a disconnect/inactive call state in the call register on a subsequent entry to NSC START at which time steps 4426, 4428 and 4430 idle service circuits and remove the call from the NSC.

The RENV message generated at step 4616 of the NSC program is received and decoded at step 3918 of the ACP program in FIG. 39. As a result, routine RENV in FIG. 39 is entered. Steps 3920 and 3922 add an appropriate header to the RENV message and transmit it to NCP 120. This is shown as encircled step 11 in FIG. 1.

Figure 66:
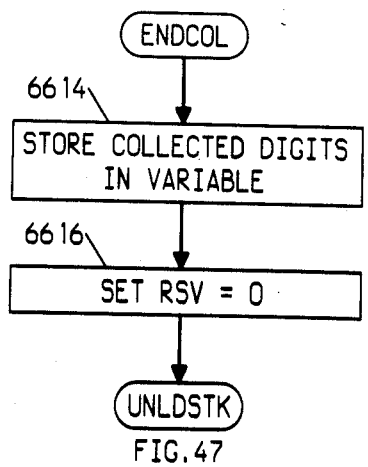

The RENV message is placed in the response queue when it is received at NCP 120. When it is unloaded from the queue, step 4718 of QP in FIG. 47 transfers control to ENDCO1 in FIG. 66 using the CPM placed onto the stack by step 6512. Step 6614 stores the collected digit returned in the RENV message in register 1 as specified in collect node 10 of the CP. Step 6616 sets the RSV to a return value of 0 and goes to UNLDSTK.

Figure 52:
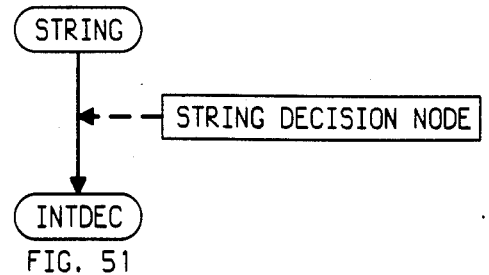

The next stack entry contains a CPM to enter CONTSEQ in FIG. 55. It may be recalled that this CPM was pushed onto the stack at step 5402 in connection with the start of execution of sequence node 9. The RSV value 0 returned by node 10 is compared against the value stored in sequence node 9 by step 5512 of CONTSEQ. The values match in this case as seen in node 9 of FIG. 34. Therefore, step 5512 continues with execution of sequence node 9. Steps 5516, 5518 and 5520 setup to return to CONTSEQ after execution of the next child node 11 as shown in FIG. 32. Node 11 performs a string decision on the contents of register 1 which now contains the digit 2 inputted by the caller. String decision nodes are executed by routine STRING in FIG. 52. FIG. 52 shows STRING as transferring to INTDEC for execution. This is for simplicity, it being understood that the same logical steps performed by INTDEC are preformed by STRING with the obvious modifications necessary for processing string data.

Figure 62:
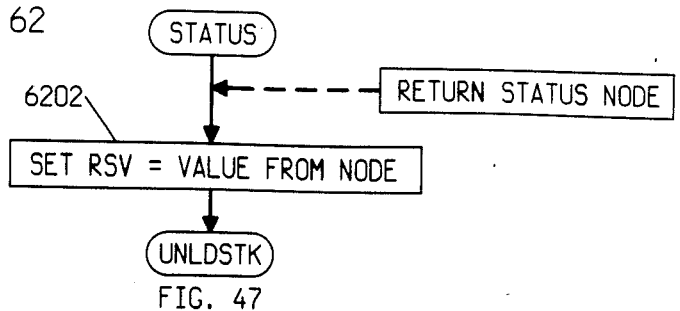
Figure 67:
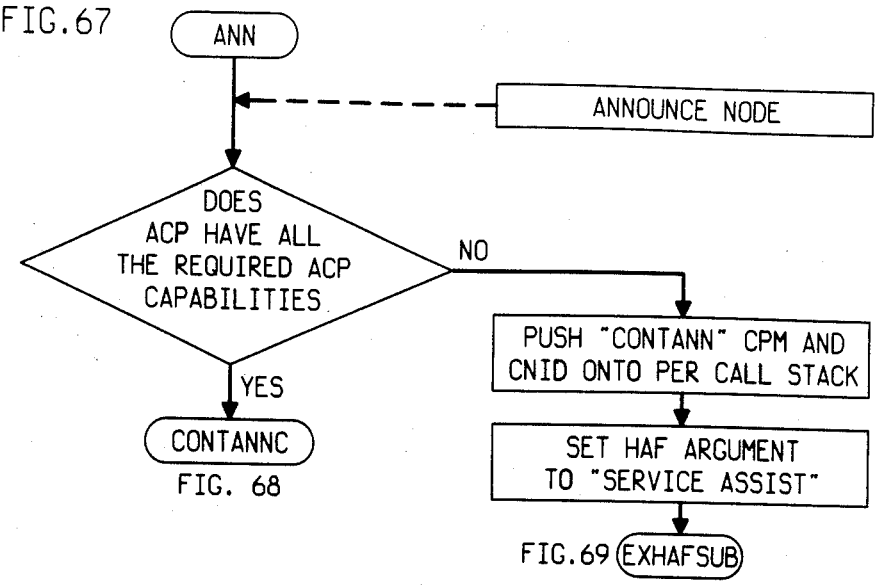
Figure 68:
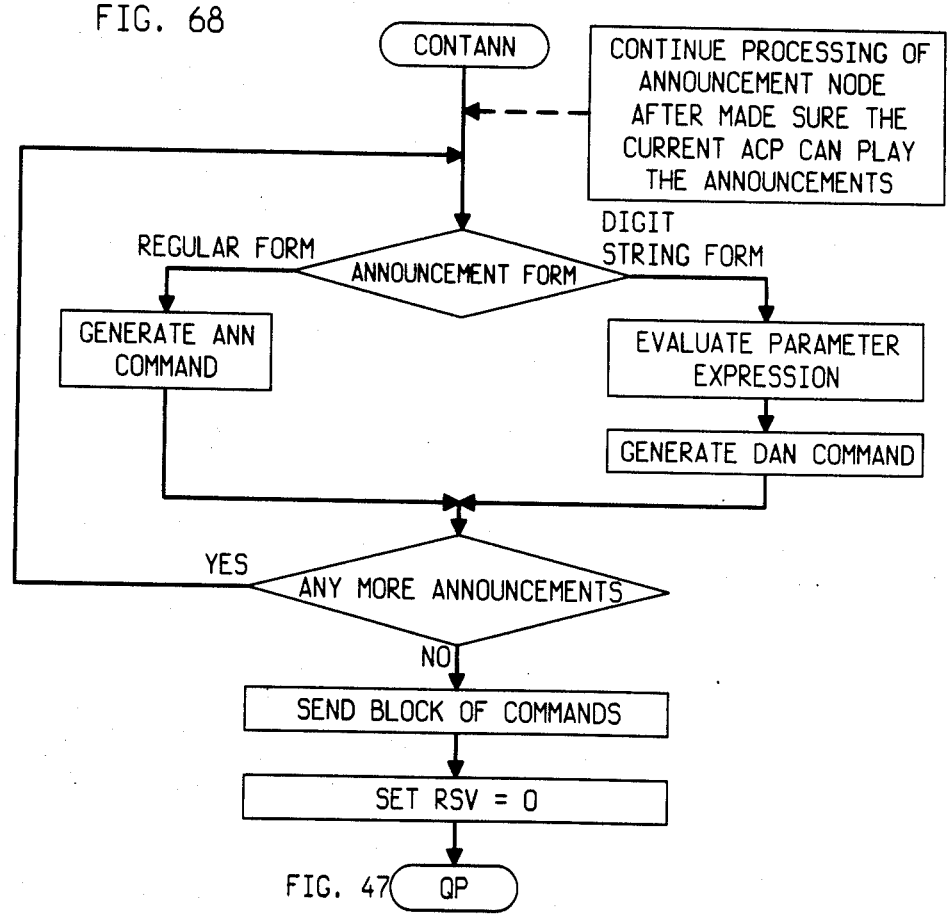

We will discuss briefly at this point the actions that would be taken had the caller inputted an information digit other than 2. Assume first that a digit other than 1 or 2 was inputted. FIG. 32 shows that return status node 12 would be executed. This type of node is executed by routine STATUS in FIG. 62. Step 6202 sets the RSV to the value specified in the node. In node 12, the RSV value is 3. This is a fail value because it is not the value 0 stored in sequence node 9. Since this leg of the CP represents the last child leg of node 9, node 9 returns control to sequence node 8 (its parent) with RSV still set to 3 from return status node 12. An RSV of 3 is the value stored in node 8. Therefore, node 8 executes its next child node. FIG. 32 shows that the next child node of 8 returns to sequence node 9. Thus, a second attempt to get the caller to input a valid information digit 1 or 2 is performed. If an incorrect digit is inputted again by the caller, the RSV of 3 returned to node 8 will cause it to execute its last child node 23. Node 23 is an announce node executed by routine ANN in FIG. 68. ANN first determines if the present serving ACP has the capability to perform announcements and particularly the announcement number specified in the node. If not, a service assist ACP is located in the same manner as already discussed. Control eventually reaches CONTANN in FIG. 67 where the appropriate ANN and/or DAN commands are generated and transmitted to the serving ACP to perform a desired announcement. In this example, an appropriate announcement might be "Sorry, your call cannot be completed as dialed. Please call the operator for assistance."

Figure 59:
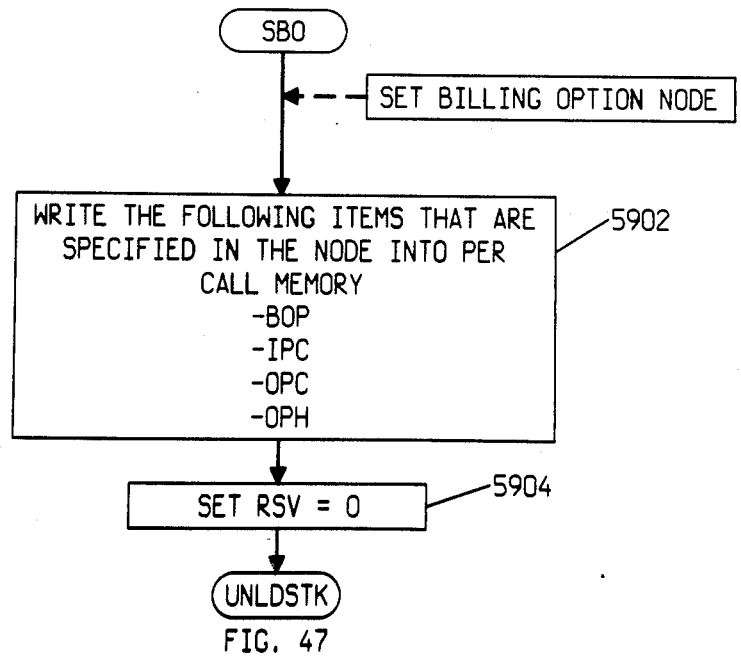

If it is assumed that the caller inputted information digit 1 at node 11, sequence node 13 would be executed. The first child node of node 13 is set billing option node 14. In response to a set billing option node, step 5902 of routine SB0 in FIG. 59 reads values for specified fields of the per call memory from the node and stores the values in the specified field. Node 14 specifies a BOP value of 1 which means "toll free" to the caller. Step 5904 sets the RSV to 0. This causes sequence node 13 to advance to its next child node 15 which is a connect node. This type of node is discussed in detail at a more appropriate time below.

Since in our actual example, the caller dialed a 2 information digit at collect node 10, string decision node 11 actually advances to sequence node 16. The first child node 17 of sequence node 16 sets the billing option parameter in per call memory to the value 4 specified in the node (see FIG. 35). This specifies that fixed charges are billed to the caller and the remaining charges are to be billed to the customer. The node also specifies a value for IPC equal to 10. This specifies the caller fixed charges to be 5 cents×10 for a total of 50 cents.

Figure 63:
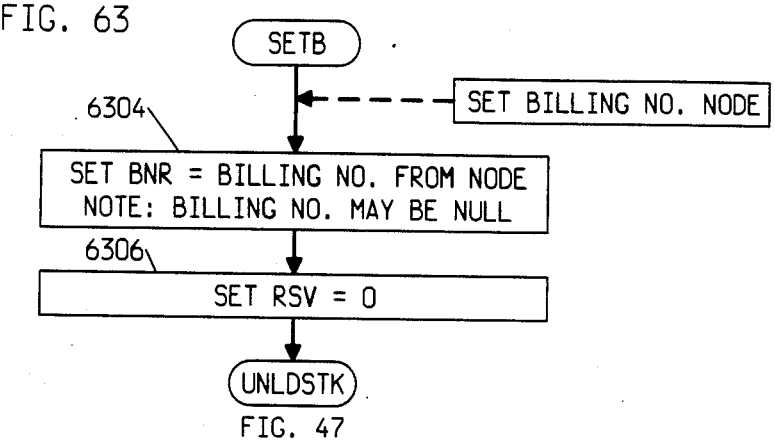

The next node executed is set billing number node 18. This is an instance of a situation in which the customer wishes to bill to a number other than its DSDC number. Routine SETB in FIG. 63 executes this type of node. Step 6304 sets the billing number record (BNR) of per call memory to the number specified in the node, which in this instance is 916-477-2000 corresponding to office 161 in FIG. 1.

The final child of node 16 is string decision node 19. As shown in FIG. 35, the parameter expression specified in node 19 is a substring function consisting of the first three characters of the calling station number. The purpose is to find the area code of the calling station. All outcome values specified in node 19 of FIG. 35 are area codes considered by the customer to be located in the "eastern half" of the country. If the evaluation of the parameter expression results in one of these outcome values, node 20 will be executed. Otherwise, the default node 22 will be executed.

In the present example, the caller is located on the west coast. Therefore, connect node 22 is executed by routine CONNECT in FIG. 61. Step 6102 evaluates the parameter expression stored in the node to obtain the telephone number to which the call is to be routed. This is 916-477-2000 in this example. A service assist is presently in progress to ACP 111 in this example. Therefore, steps 6103 and 6104 generate a CLA command to release the assist ACP111.

Since a BIL command has not yet been sent during execution of the CP (step 6106) in this example, step 6110 generates a BIL command with CPS (call progress stopped)=1. A value of 1 in CPS means that this call is routed to a destination number rather than to some type of final treatment. Ultimately the value of CPS is included in the billing record at the ACP and used to price the billing for this call.

If the billing number record (BNR) in per call memory contains a billing number, steps 6112 ad 6114 generate an SETB command to transmit the billing number to ACP 110. This occurs in our example, because BNR was set to a nonzero value by node 17.

If a handoff has occurred on this call, the handoff ACP requires the calling station number and the customer SAC number. SETA and SETO commands are generated at step 6120 to accomplish this. This does not occur in our example.

Step 6122 generates a SETR command to give the destination number to the ACP. Step 6124 generates an RTE command to instruct the ACP to route the call to the destination number. The last step 6126 in the execution of the connect node 22 sets RSV to 0. At this time QP in FIG. 47 is entered to perform work on this and other calls.

To summarize, CLA, BIL, SETB, SETR and RTE commands are generated by the connect action above. This block of commands is sent to ACP 110 as encircled step 12 on link 130 in FIG. 1.

In response to the CLA command, step 4112 of routine CLA (FIG. 41) at ACP 110 obtains the call register address for the assist call to ACP 111 by using the conversation number in item 204 (FIG. 2) of the command block to locate the trunk register. It is recalled that the conversation number is the trunk number on which the call arrived at ACP 110. The trunk register is used to locate the call register. An assist number in item 4208 of the call register points to the correct address in the assist list. Step 4114 writes the call state vector in the call register to a "disconnect" state. Step 4116 clears the entry in the assist list. Step 4118 loads the trunk register to return control to address C in FIG. 39 after the assist call has been disconnected. Conventional call processing software then disconnects the assist call to ACP 111. This is encircled step 13 on trunk 112 in FIG. 1. When control is returned to address C, the remaining commands are executed.

Figure 40:
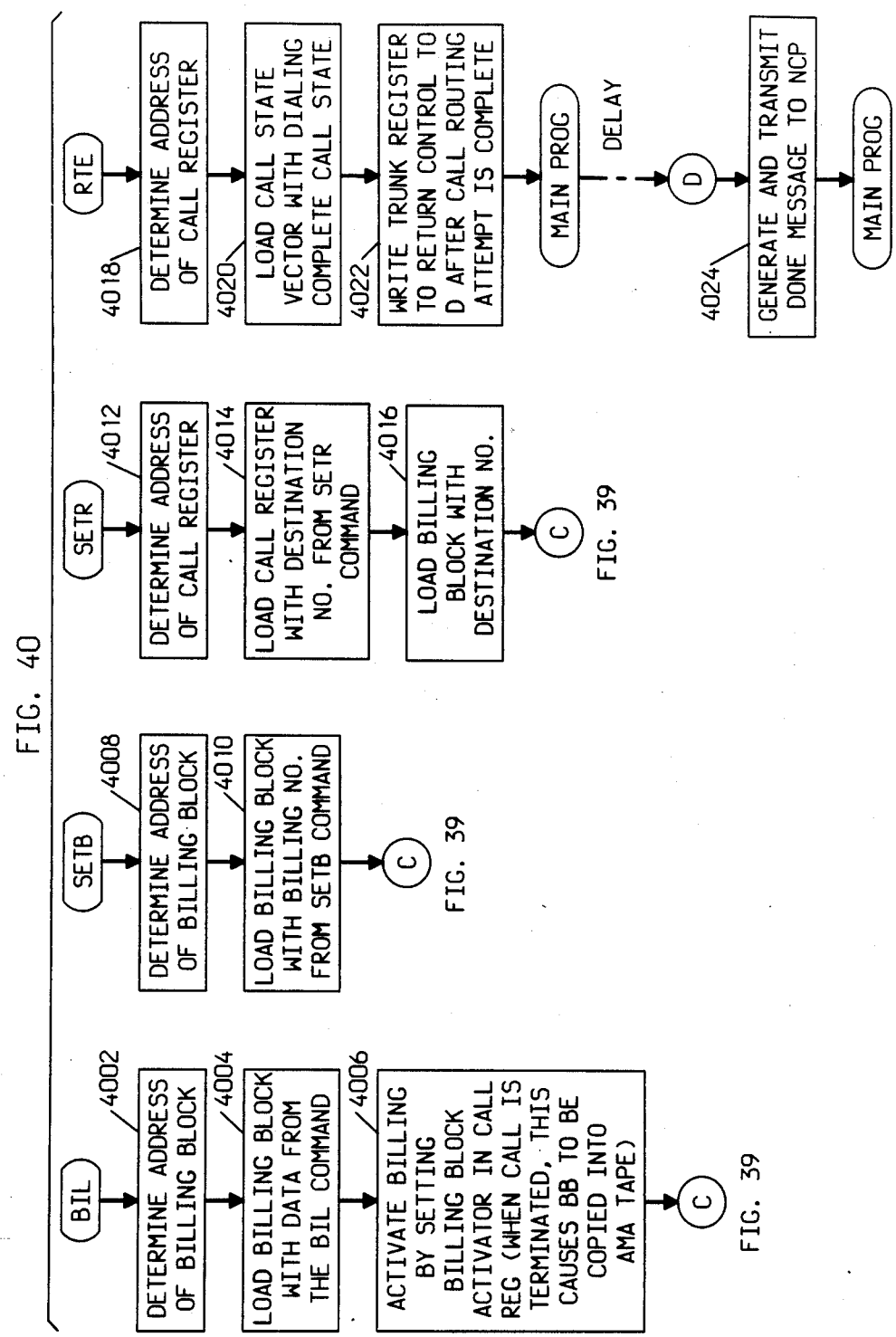

In response to the BIL command, step 4004 of routine BIL in FIG. 40 loads the appropriate items of a billing block with the data included in the BIL command (see FIG. 3). Step 4006 sets a billing block activation indicator in the call register for this call. This activator causes the billing block to be copied into an automatic message accounting (AMA) record when a disconnect is detected. Step 4010 in FIG. 40 loads the billing number in the SETB command into the billing block in response to the SETB command. Steps 4014 and 4016 load the call register and billing block with the destination number from the SETR command. In response to the RTE command, step 4020 of routine RTE loads the call state vector in the call register to "dialing complete." Step 4022 loads the trunk register with a trunk state vector to cause the conventional calling processing software at ACP 110 to return control to address point D in FIG. 40 after routing the call. RTE then enters the main ACP program where the conventional software routes the call to the destination number placed in the call register. This is encircled step 14 on trunk 113 in FIG. 1. When control is returned to address D, step 4024 transmits a DONE message to NCP 120 to indicate completion of the commands. This is encircled step 15 on link 130 in FIG. 1.

When the DONE message is received from ACP 110, UNLDSTK unloads the top entry for this call and transfers to CONTSEQ in FIG. 55. At this point, the stock contains CONTSEQ entries placed there in connection with sequence nodes 16, 9, 8 and 6. For the first, CONTSEQ entry, step 5512 checks the returned value of RSV against the value stored in node 16. Since 0 is the RSV returned which is also the value stored in node 16, step 5514 is next executed. This step determines that the last child node of node 16 has been executed and ceases execution of node 16 by transferring to UN-LDSTK. The next stack entry returns to CONTSEQ in connection with the execution of node 9. Since the last child node of node 9 has been executed, CONTSEQ goes UNLDSTK to process the CONTSEQ entry from node 8. node 22. The RSV value stored in node 8 is 3. Therefore, step 5512 of CONTSEQ mismatches and terminates node 8 by transferring to UNLDSTK. The CONTSEQ stack entry from sequence node 6 is next processed. The end of call CPM stored in the stack by step 5006 is encountered by UNLDSTK and control is transferred to EOC in FIG. 48. Steps 4826 and 4828 determine that this call has been routed to a destination number and performs bookkeeping operations to remove this call from the NCP system.

If we assume that the caller was located on the east coast for discussion purposes, then integer decision node 20 would have been executed. The parameter expression in node 20 of FIG. 36 is an evaluation of the time of the week when a call is originated. Arguments of the expression specify that evaluation of the time of week should be in terms of eastern time zone and daylight savings time. The numbers in the outcome values, such as 1979 for outcome value 1, represent elapsed minutes to the present time, measured from 12 o'clock midnight of the previous Saturday. Thus, the value 1979 in outcome 1 represents one minute before nine a.m. on Monday. A range flag is set in node 20. This means that all values of the parameter expression from 1979 up to but not including the next outcome value are to be considered as outcome 1. It will be seen by examining the outcome values of node 20 in FIG. 36 that call originations occurring during the hours of nine to five p.m. will result in the execution of node 21. All other outcomes result in the execution of node 22.

When an end-of-call CPM is encountered in the stack, it is possible that the call has not been routed to a destination. Execution of node 23 would be an example of this in the present example. In such a case, checks must be made to insure that the ACP has or will receive certain commands to properly terminate the call. It is also possible in some circumstances that an assisting ACP is still associated with the call at this time. In this event, steps 4730 and 4732 generate a CLA command to release the assisting ACP. If a BIL command has already been generated on this call (step 4902), then a FIN command is generated at step 4914 with a prescribed default final treatment such as recorder tone specified by the FIN command. If a BIL command has not been priorly generated, step 4904 generates such a command with CPS (call progress stopped) set to 2 for billing purposes to indicate that the call was not completed.

If the BNR contains a special billing number, steps 4906 and 4908 generate a SETB command including the special billing number to insure that call billing is made to this number in accordance with the customer's requirements.

If a handoff to another ACP was priorly performed, for billing purposes steps 4910 and 4912 generate a SETA command to insure that the handoff ACP has the calling station number, and a SETO command to insure that the handoff ACP has the original dialed customer number.

The commands generated immediately above are always succeeded by a FIN command generated at step 4914 and the block of commands are transmitted to the ACP at step 4916. At this point, NCP operations are complete with respect to this call.

An exception (EXC) that might be received by NCP 120 during control of a call is processed at steps 4726 and 4728. If the EXC message indicates that the failure or abnormality occurring on the call is fatal, meaning that command cannot be executed for some reason, steps 4728 and 4724 remove the call from the NCP system. If the failure or abnormality is nonfatal, then control is given to EOC in FIG. 48 to terminate the call in an orderly fashion as described above.

It is to be understood that the above-described arrangement is merely illustrative of the application of the principles of the invention and that other arrangements may be devised by those skilled in the art without departing from the spirit and scope of the invention.

What is claimed is:

1. A method of controlling the operations of a telephone office serving to call to obtain call processing feature capability otherwise unavailable at the serving telephone office, comprising the steps of executing a program associated with a specific customer in response to a call to the customer, the program containing instructions for ascertaining prescribed parameters of the call and instructions specifying the performance and order of performance of ones of a plurality of independent call processing primitives for processing the call in accordance with the customer program and the call parameters, determining if the serving office is able to perform all the primitives required by the customer program, if the serving office is unable to perform a required primitive, selecting a second office able to perform the primitive unavailable in the serving office, transferring control of the call to the second office and transmitting information to the second office informing it to execute the primitive unavailable at the serving office.

2. The invention of claim 1 further comprises the step of returning control of the call from the second office to the serving office after performance of the primitive unavailable at the serving office.

3. The invention of claim 1 further comprising the step of performing all remaining required call processing primitives required to complete the call at the second office after transferring control of the call to the second office.

4. In a telephone system comprising a plurality of telephone offices, a data base and data links interconnecting the offices and data base, a method of sharing call processing operations between offices with respect to a given call to a customer, comprising the steps of transmitting a request, including an identification of the customer, for call processing instructions from a serving office to the data base in response to receipt of a call at the serving office, at the data base, executing a customer program to determine how to process the call, determining if the serving office has all call processing capabilities to complete the call according to the customer program, if the serving office is unable to complete the call according to the customer program, selecting a second office from information stored at the data base that should be able to so complete the call, and transmitting a destination number of the second office to the serving office, and at the serving office, routing the call to the destination number of the second office for completion of the call.

5. The invention of claim 4 further comprising the steps of transmitting a request for instructions from the second office to the data base in response to receipt of the call at the second office, the request further including an indication of the capabilities of the second office, at the data base, determining from the capability indication from the second office if the second office is able to process the call according to the customer program.

6. The invention of claim 4 wherein the destination number generated by the data base includes digits identifying the second office, digits informing the second office to request instruction from the data base, and digits assigned by the data base identifying this call at the data base.

7. The invention of claim 6 wherein the destination number generated by the data base includes digits identifying itself among a plurality of data bases.

8. The invention of claim 6 further comprising the step of transmitting a request for instruction from the second office to the data base, the request including the digits assigned by the data base to associate the request with the call at the data base.

9. The invention of claim 1 wherein a primitive required to process the call according to the customer program performs a recorded announcement to the calling station and the selecting step further comprises selecting a second office having this primitive.

10. The invention of claim 1 wherein a primitive required to process the call according to the customer program performs a specific recorded announcement to the calling station and the selecting step further comprises selecting a second office having this primitive.

11. The invention of claim 1 wherein a primitive required to process the call according to the customer program collects information digits from the calling station as a call parameter and the selecting step further comprises selecting a second office having this primitive.

12. A method of controlling the operations of a telephone office serving a call to obtain call processing feature capability otherwise unavailable at the serving telephone office, comprising the steps of interrogating a file associated with a specific customer in response to a call to the customer, the file containing instructions specifying the performance and order of performance of ones of a plurality of independent call processing primitives for processing the call in accordance with the customer file, determining if the serving office is able to perform all the primitives required by the customer file, if the serving office is unable to perform a required primitive, selecting a second office able to perform the primitive unavailable in the serving office, transferring control of the call to the second office and transmitting information to the second office informing it to execute the primitive unavailable at the serving office.

13. In a telephone system comprising a plurality of telephone offices, a data base and data links interconnecting the offices and data base, a method of sharing call processing operations between offices with respect to a given call to a customer, comprising the steps of transmitting a request, including an identification of the customer, for call processing instructions from a serving office to the data base in response to receipt of a call to the customer at the serving office, at the data base, interrogating a customer file to determine how to process the call, determining if the serving office has all call processing capabilities to complete the call according to the customer file, if the serving office is unable to complete the call according to the customer file, selecting a second office from information stored at the data base that should be able to so complete the call, and transmitting a destination number of the second office to the serving office, and at the serving office, routing the call to the destination number of the second office for completion of the call.

* * * * *